(12) United States Patent
Ran et al.

(10) Patent No.: US 11,200,395 B2
(45) Date of Patent: Dec. 14, 2021

(54) GRAPHIC CODE RECOGNITION METHOD AND APPARATUS, TERMINAL, AND STORAGE MEDIUM

(71) Applicant: Tencent Technology (Shenzhen) Company Limited, Shenzhen (CN)

(72) Inventors: Chen Ran, Shenzhen (CN); Dianping Xu, Shenzhen (CN); Yugeng Lin, Shenzhen (CN); Jie Miao, Shenzhen (CN); Xiaoyi Jia, Shenzhen (CN); Mei Jiang, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

(21) Appl. No.: 17/105,119

(22) Filed: Nov. 25, 2020

(65) Prior Publication Data

US 2021/0150170 A1 May 20, 2021

Related U.S. Application Data

(63) Continuation of application No. PCT/CN2019/110359, filed on Oct. 10, 2019.

(30) Foreign Application Priority Data

Oct. 22, 2018 (CN) .......................... 201811231652.0

(51) Int. Cl.
*G06K 7/14* (2006.01)
*G06K 9/32* (2006.01)
*G06N 3/04* (2006.01)

(52) U.S. Cl.
CPC ......... *G06K 7/1443* (2013.01); *G06K 9/3233* (2013.01); *G06N 3/04* (2013.01); *G06K 7/1417* (2013.01)

(58) Field of Classification Search
CPC .. G06K 7/1433; G06K 7/1417; G06K 7/1413; G06K 9/3233; G06N 3/04
See application file for complete search history.

(56) References Cited

U.S. PATENT DOCUMENTS

| 2002/0148898 | A1* | 10/2002 | Gregerson | ......... G06K 7/10851 |
| | | | | 235/462.05 |
| 2012/0091204 | A1* | 4/2012 | Shi | ........................ G06K 7/146 |
| | | | | 235/437 |

(Continued)

FOREIGN PATENT DOCUMENTS

| CN | 204155287 U | 2/2015 |
| CN | 107609437 A | 1/2018 |

(Continued)

OTHER PUBLICATIONS

International Search Report and Written Opinion with English Translation for International Patent Application No. PCT/CN2019/110359 dated Jan. 9, 2020; 12 pages.

(Continued)

*Primary Examiner* — Matthew Mikels
(74) *Attorney, Agent, or Firm* — Crowell & Moring LLP

(57) ABSTRACT

A graphic code recognition method includes: displaying a target image, the target image comprising at least two graphic codes; in response to receiving a graphic code recognition operation on the target image for selecting one of the at least two graphic codes to recognize, obtaining graphic code position information of the at least two graphic codes in the target image; determining a target graphic code indicated by the graphic code recognition operation according to the graphic code position information, the target graphic code belonging to the at least two graphic codes; and displaying a target graphic code recognition result corresponding to the target graphic code.

18 Claims, 11 Drawing Sheets

(56) References Cited

U.S. PATENT DOCUMENTS

2013/0341401 A1 12/2013 Kannan et al.
2015/0016670 A1 1/2015 Zhou et al.

FOREIGN PATENT DOCUMENTS

| CN | 108537197 A | 9/2018 |
| CN | 108563972 A | 9/2018 |
| CN | 109409161 A | 3/2019 |
| EP | 2819062 A1 | 12/2014 |

OTHER PUBLICATIONS

Office Action for Chinese Patent Application No. 201811231652.0 dated Nov. 28, 2019; 11 pages.
Office Action for Chinese Patent Application No. 201811231652.0 dated Apr. 7, 2020; 7 pages.
Extended European Search Report for European Patent Application No. 19876710 dated Jul. 6, 2021; 6 pages.

* cited by examiner

GRAPHIC CODE RECOGNITION METHOD AND APPARATUS, TERMINAL, AND STORAGE MEDIUM

RELATED APPLICATION

This application is a continuation application of the International PCT Application No. PCT/CN2019/110359, filed with the China National Intellectual Property Administration, PRC on Oct. 10, 2019 which claims priority to Chinese Patent Application No. 201811231652.0, entitled "GRAPHIC CODE RECOGNITION METHOD AND APPARATUS, TERMINAL, AND STORAGE MEDIUM" and filed with the China National Intellectual Property Administration, PRC on Oct. 22, 2018, which are incorporated herein by reference in their entireties.

FIELD OF THE TECHNOLOGY

Embodiments of this application relates to the field of graphic code recognition, and in particular, to a method, an apparatus, a terminal, and a storage medium for graphic code recognition.

BACKGROUND OF THE DISCLOSURE

A graphic code is a carrier of information or data. Common graphic codes include a barcode, a two-dimensional barcode, and the like.

In related arts, a graphic code contained in an image can be recognized by a terminal and corresponding operations will be performed according to a recognition result. For example, when the recognition result is a website, the terminal jumps to a web page; and when the recognition result is a payment link, the terminal displays a payment interface.

However, when the image includes at least two graphic codes, the terminal may only recognize one of the graphic codes. If the recognized graphic code is not a graphic code that the user expects to recognize, the user needs to manually capture, from the image, the graphic code that is expected to be recognized, and then the graphic code is recognized, resulting in impact on efficiency of graphic code recognition.

SUMMARY

According to various embodiments of this disclosure, a graphic code recognition method and apparatus, a terminal, and a storage medium are provided.

A graphic code recognition method is provided. The method is performed by a terminal and includes:

displaying a target image, the target image including at least two graphic codes;

obtaining, in a case that a graphic code recognition operation on the target image for selecting one of the at least two graphic codes to recognize is received, graphic code position information of the at least two graphic codes in the target image;

determining a target graphic code indicated by the graphic code recognition operation according to the graphic code position information, the target graphic code belonging to the at least two graphic codes; and displaying a target graphic code recognition result corresponding to the target graphic code.

A graphic code recognition apparatus is provided. The apparatus is disposed in a terminal and includes:

an image display module, configured to display a target image, the target image including at least two graphic codes;

a position obtaining module, configured to obtain, in a case that a graphic code recognition operation on the target image for selecting one of the at least two graphic codes to recognize is received, graphic code position information of the at least two graphic codes in the target image;

a target determining module, configured to determine a target graphic code indicated by the graphic code recognition operation according to the graphic code position information, the target graphic code belonging to the at least two graphic codes; and a result display module, configured to display a target graphic code recognition result corresponding to the target graphic code.

A terminal is provided, including one or more processor and a memory, the memory storing at least one computer-readable instruction, at least one program, a code set, or a computer-readable instruction set, the at least one computer-readable instruction, the at least one program, the code set, or the computer-readable instruction set being executed by the one or more processors to implement the graphic code recognition method according to the foregoing aspect.

One or more non-transitory computer-readable storage media are provided, storing at least one computer-readable instruction, at least one program, a code set, or an computer-readable instruction set, the at least one computer-readable instruction, the at least one program, the code set, or the computer-readable instruction set being executed by one or more processors to implement the graphic code recognition method according to the foregoing aspect.

Details of one or more embodiments of this disclosure are provided in the accompany drawings and descriptions below. Based on the specification, the accompanying drawings, and the claims of this application, other features, objectives, and advantages of this application become more obvious.

BRIEF DESCRIPTION OF THE DRAWINGS

To describe the technical solutions of the embodiments of this disclosure more clearly, the following briefly introduces the accompanying drawings required for describing the embodiments. Apparently, the accompanying drawings in the following description show merely some embodiments of this disclosure, and a person of ordinary skill in the art may still derive other drawings from the accompanying drawings without creative efforts.

DESCRIPTION OF EMBODIMENTS

To make the objectives, technical solutions, and advantages of this application clearer, the following further describes implementations of this application in detail with reference to the accompanying drawings. It is to be understood that the specific implementations described herein are only used to describe this application, instead of limiting this application.

Figure 1:
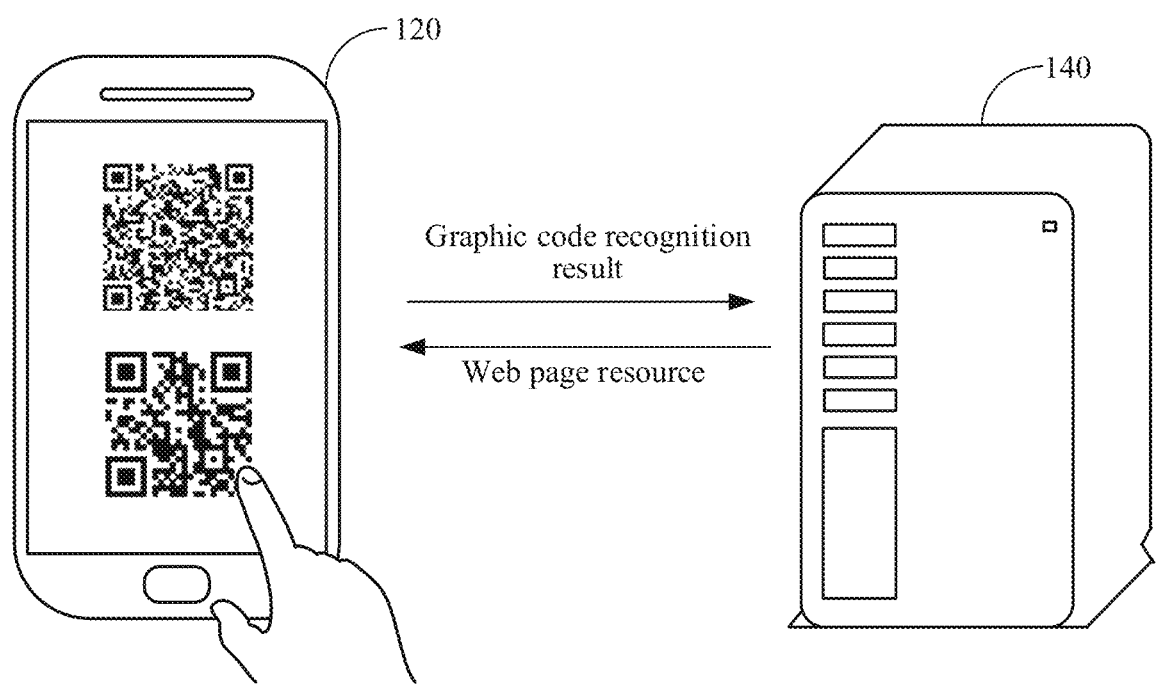
FIG. 1 shows a schematic diagram of and exemplary implementation environment according to an embodiment of this disclosure.

FIG. 1 shows a schematic diagram of implementation environment according to an embodiment of this disclosure. The implementation environment includes a terminal 120 and a server 140.

The terminal 120 is an electronic device having a graphic code recognition function, and the electronic device may be a smartphone, a tablet computer, a personal computer, or the like. In FIG. 1, description is made by using an example in which the terminal 120 is a smartphone.

The graphic code recognition function may be provided by an operating system of the electronic device, or may be provided by a third-party application program installed on the electronic device. The third-party application program may be, but is not limited to, a payment application program, an instant messaging application program, a shopping application program, a video playback application program, a browser application program, or the like. This is not limited in this embodiment of this disclosure.

A graphic code recognized by the terminal 120 may be a picture, for example, a picture received in the instant messaging application program; or an image collected through an image capturing or scanning device or component such as a camera, for example, an image scanned after a graphic code scanning function of the application is enabled. There is no limitation on the manner of acquiring the graphic code in this embodiment of this disclosure.

The terminal 120 in this embodiment of this disclosure may further have a target detection function. With the help of the target detection function, the terminal 120 may recognize positions and/or types of graphic codes in the image to subsequently extract the graphic codes from the image according to the positions of the graphic codes, and perform graphic code recognition by using corresponding decoders according to the types of the graphic codes, to obtain graphic code recognition results.

In a possible implementation, the target detection function may be implemented by a target detection model obtained based on deep learning training. The target detection model is configured to take input such as, position information and position confidences of graphic codes in the image, and/or types and type confidences of the graphic codes, according to an inputted image.

The terminal 120 is connected to the server 140 through a wired or wireless network.

The server 140 may be a server, a server cluster formed by several servers, or a cloud computing center.

In one implementation, the server 140 may be a resource server, and is configured to provide a web page resource. In a possible implementation scenario, after the terminal 120 receives a graphic code recognition operation and completes a target graphic code recognition to obtain a graphic code recognition result, the terminal 120 obtains a web page resource from the corresponding server 140 according to the graphic code recognition result, and further displays the web page resource.

In one implementation, a communication technology and/or protocol may be used for the foregoing wireless network or the wired network. The network may be the Internet, or any other type of network including but not limited to, a local area network (LAN), a metropolitan area network (MAN), a wide area network (WAN), a mobile, wired, or wireless network, or any combination of a dedicated network or a virtual dedicated network. In some embodiments, technologies and/or formats, such as hypertext markup language (HTML) and extensible markup language (XML), are used for representing data exchanged through a network. In addition, all or some links may be encrypted by using encryption technologies such as secure socket layer (SSL), transport layer security (TLS), virtual private network (VPN), and internet protocol security (IPsec). In some other embodiments, custom and/or dedicated data communication technologies may also be used in place of or in addition to the foregoing data communication technologies.

The graphic code recognition method provided by the embodiments of this disclosure may be performed by the terminal 120 in FIG. 1. For example, the terminal 120 may implement graphic code recognition function locally to obtain a graphic code recognition result. Alternatively, in other possible implementations, the terminal 120 may upload a to-be-recognized image to a backend server. The backend server performs graphic code recognition on the image and feeds back a graphic code recognition result for the terminal 120 to display. This is not limited in this embodiment of this disclosure.

The graphic code recognition method provided by the embodiments of this disclosure may be used for implementing recognition of one picture including a plurality of graphic codes. That is, recognizing a specified graphic code in a multi-graphic code image (referring to an image including a plurality of graphic codes). Application scenarios to which the graphic code recognition method is applicable may include and is not limited to a code-scanning recognition scenario and a long press recognition scenario. The following describes the graphic code recognition method in different application scenarios.

Code-Scanning Recognition Scenario

In daily life, it is often needed to scan a code with a terminal, for example, follow an official social networking account by scanning a two-dimensional barcode of the account, perform a self-service ordering by scanning a two-dimensional barcode for ordering, make a payment by scanning a two-dimensional barcode for payment, and the like. In some code-scanning recognition scenarios, the terminal may capture an image that includes a plurality of graphic codes. For example, when scanning a code for payment, the terminal collects an image that includes both a payment acceptance code A (corresponding to a payment application program A, or payment method A) and a payment acceptance code B (corresponding to a payment application program B, or payment method B). In this scenario, the terminal first recognizes graphic code positions of the graphic codes in the image by using the graphic code recognition method, and then determines, according to the graphic code positions, a target graphic code that meets a recognition intention of a user, thereby recognizing the target graphic code to obtain a corresponding graphic code recognition result.

Long Press Recognition Scenario

When using an application program, a user often views a picture that includes graphic codes. For example, when an instant messaging application program is used, a picture that includes graphic codes and that is sent by another user is received, or when a browser application program is used, a displayed web page picture includes graphic codes. In this case, the user may trigger the terminal to recognize the graphic code in the picture by long pressing the picture. The terminal first recognizes graphic code positions of graphic codes in a picture by using the graphic code recognition method, and then determines, according to the graphic code positions and a long press position, a target graphic code that a user expects to recognize, thereby recognizing the target graphic code to obtain a corresponding graphic code recognition result.

Certainly, in addition to being applied to the foregoing scenarios, the foregoing graphic code recognition method may further be used in other recognition scenarios involving one picture including a plurality of codes. This is not limited in this embodiment of this disclosure.

Figure 2:
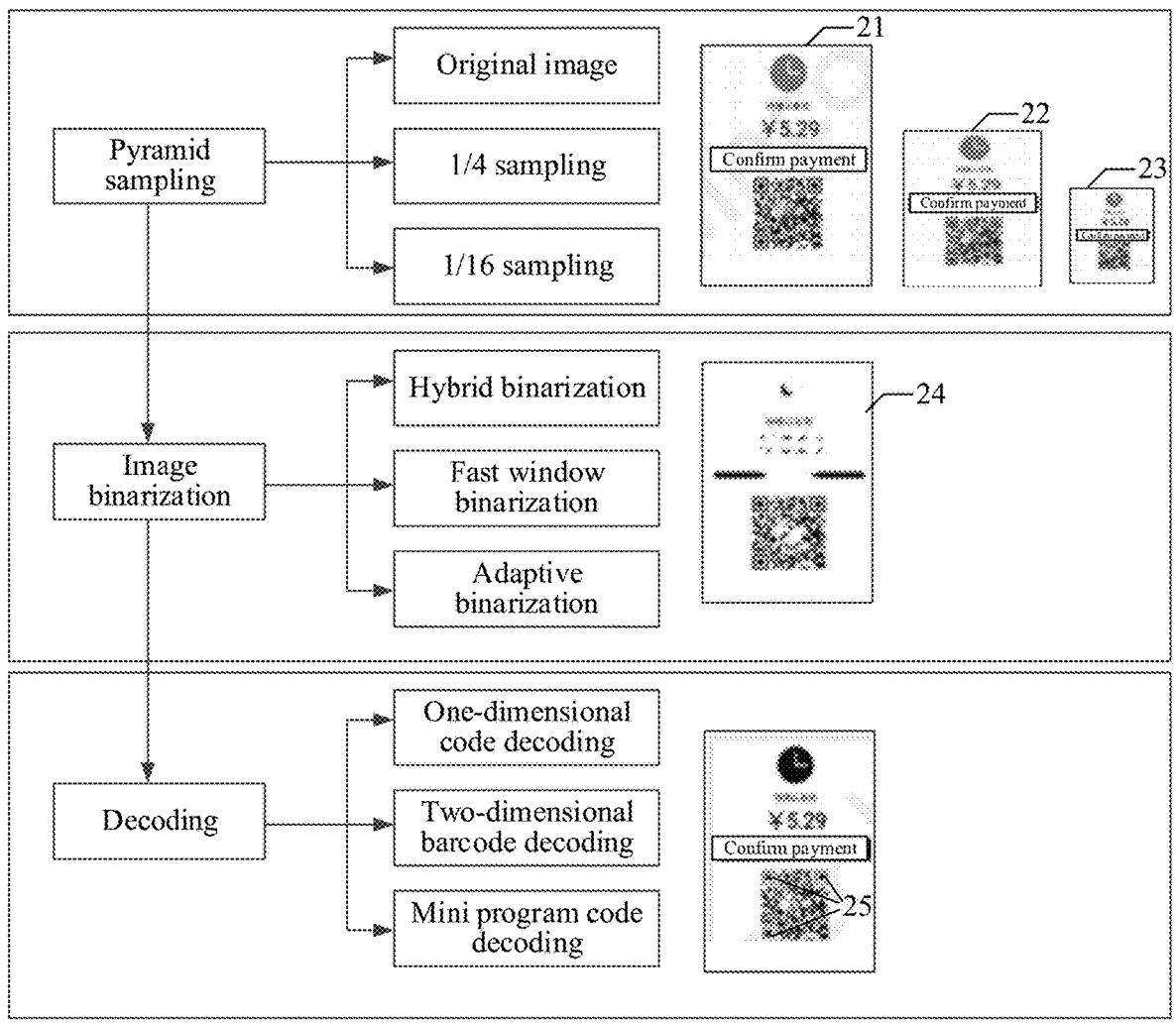
FIG. 2 is a flowchart of a graphic code recognition process in the related art.

For example, a graphic code is recognized through long pressing, as shown in FIG. 2, which shows a flowchart of a graphic code recognition process.

After a to-be-recognized image (original image) is obtained, because of size sensitivity of graphic code recognition, a terminal needs to down-sample the original image in a manner of pyramid sampling to obtain downsampled images of different sizes. As shown in FIG. 2, after pyramid sampling is performed, an original image 21, a ¼ downsampled image 22, and a ¹⁄₁₆ downsampled image 23 are obtained.

For the obtained downsampled images, to facilitate the subsequent graphic code decoding, the terminal performs image binarization processing on the downsampled images to obtain binary images including only two colors, black and white. When the image binarization processing is performed, hybrid binarization, fast window binarization, and adaptive binarization may be adopted. As shown in FIG. 2, after the terminal performs image binarization processing on the original image 21, a binary image 24 is obtained.

Further, the terminal tries various decoders to decode the obtained binary image. For example, the terminal decodes a one-dimensional code by using a one-dimensional code decoder and decodes a two-dimensional barcode by using a two-dimensional barcode decoder. If decoding fails, a next decoder is tried until the decoding succeeds. When decoding is performed by using a decoder, all pixels in the binary image need to be traversed. As shown in FIG. 2, in a process of decoding the binary image by using the two-dimensional barcode decoder, the terminal first recognizes three vertices 25 of the two-dimensional barcode, and then decodes the two-dimensional barcode.

However, when the image includes at least two graphic codes, the terminal may only decode one of the graphic codes (usually, a graphic code that is first successfully decoded in the image) if the graphic codes in the image are recognized by using the foregoing method. If the user expects to obtain a recognition result of a specified graphic code, it may not be achieved by using the foregoing method.

Figure 3:
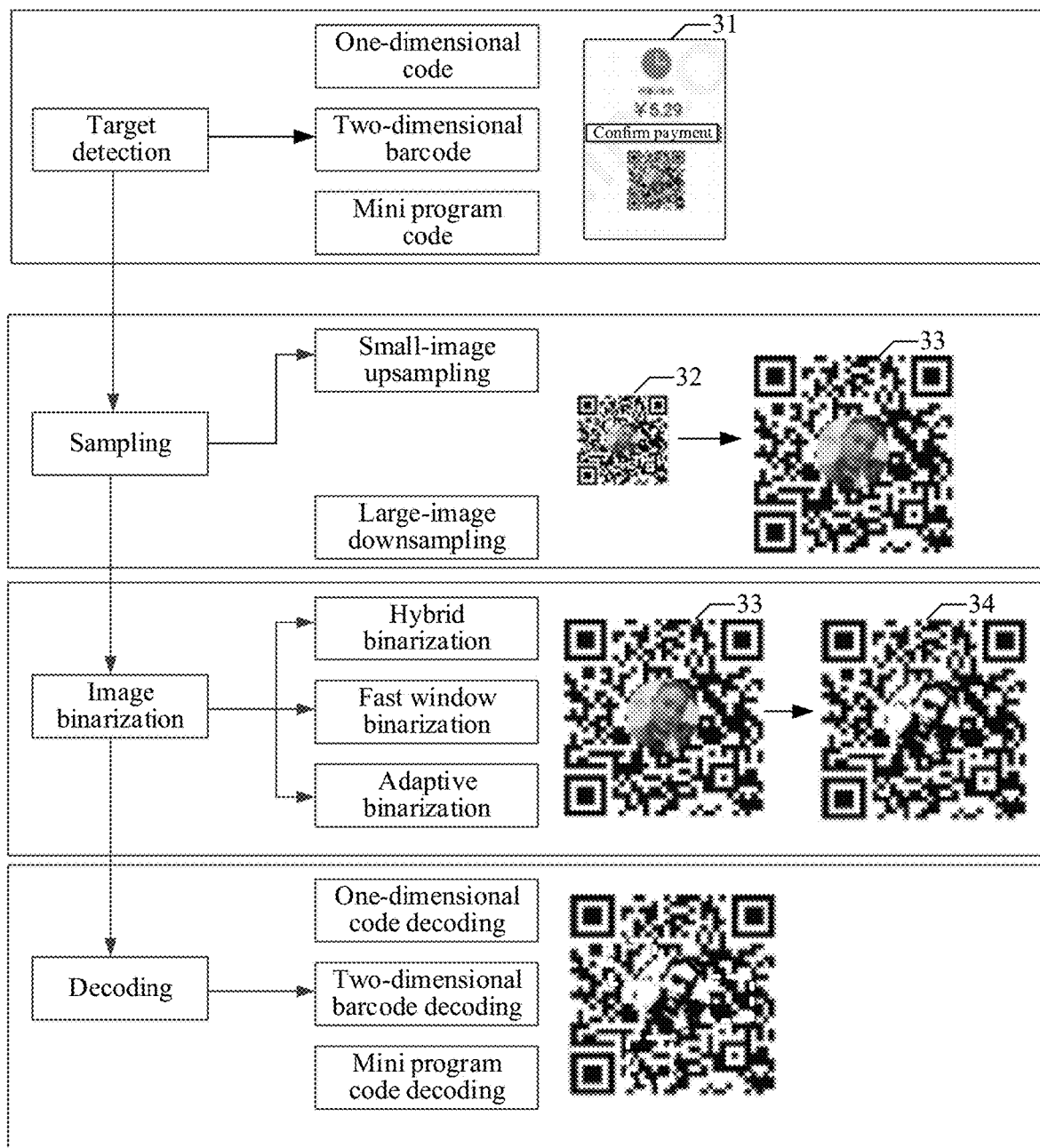
FIG. 3 is a flowchart of a graphic code recognition process according to an embodiment of this disclosure.

As such, in the graphic code recognition method provided in the embodiments of this disclosure, a brand-new graphic code recognition process is disclosed to resolve the foregoing problem. In the graphic code recognition process, as shown in FIG. 3, after obtaining a to-be-recognized image 31, the terminal first performs target detection on the to-be-recognized image 31 to obtain graphic code positions and graphic code types of graphic codes in the to-be-recognized image 31, thereby extracting the graphic codes from the to-be-recognized image 31 according to the graphic code positions. For an extracted graphic code 32, the terminal samples it based on principles of upsampling a small image and downsampling a large image to obtain a sampled image 33, and performs image binarization processing on the sampled image 33 to obtain a binary image 34. For the obtained binary image 34, according to a type of the graphic code, the terminal performs decoding by using a graphic code decoder corresponding to the type of the graphic code, to obtain a graphic code recognition result corresponding to the binary image 34. The types of the graphic codes include at least one type of a one-dimensional code (which is also referred to as a barcode) or one type of a two-dimensional barcode. The two-dimensional barcode includes at least one type of a dot two-dimensional barcode, a circular two-dimensional barcode, or a radial two-dimensional barcode. This application does not limit the specific type of the graphic code.

Further, the terminal determines a target graphic code that a user expects to recognize, thereby displaying a recognition result corresponding to the target graphic code and implementing recognition of a specified graphic code in a multi-graphic code image.

Figure 4:
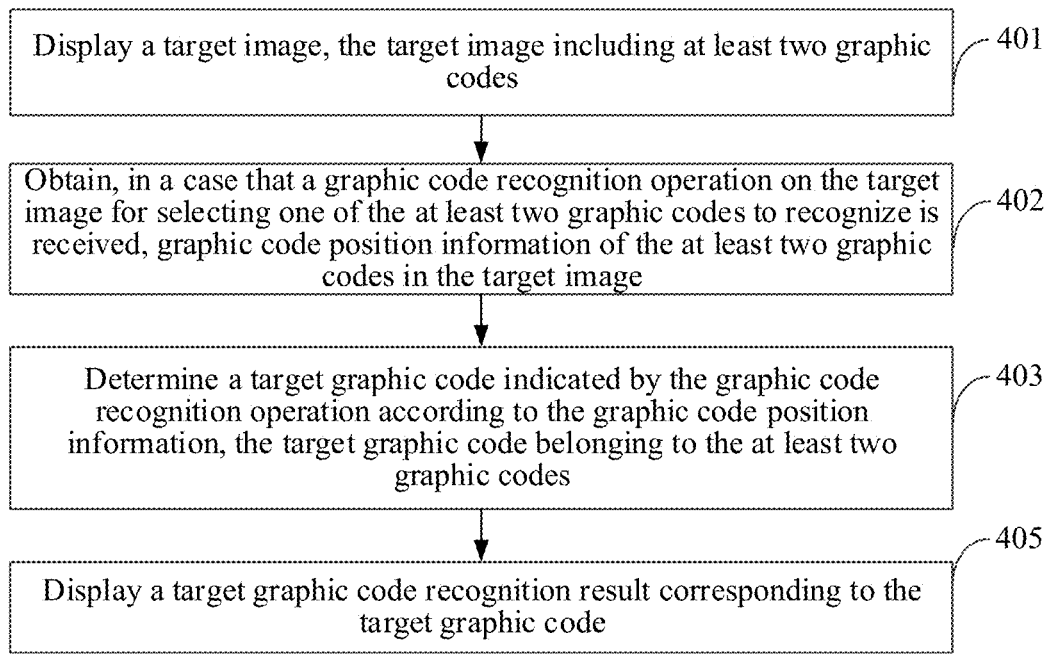
FIG. 4 shows a flowchart of a graphic code recognition method according to an embodiment of this disclosure.

FIG. 4 shows a flowchart of a graphic code recognition method according to an embodiment of this disclosure. This embodiment is described by using an example in which the method is applied to the terminal 120 in FIG. 1. The method may further include the following steps.

Step 401. Display a target image, the target image including at least two graphic codes.

Target images may be different in different application scenarios. In one implementation, in a code-scanning recognition scenario, the target image may be an image displayed in a viewfinder of the terminal, that is, the terminal collects the image in real time by using an image capturing component such as a camera; and in a long press recognition scenario, the target image may be a picture displayed by the terminal, for example, a picture received in an instant messaging application program.

The target image in this embodiment of this disclosure includes at least two graphic codes. Graphic code types of the at least two graphic codes may be the same or different.

Step 402. Obtain, when a graphic code recognition operation on the target image for selecting one of the at least two graphic codes to recognize is received, graphic code position information of the graphic codes in the target image.

In one implementation, the graphic code recognition operation is used for indicating recognition on a specified graphic code in the target image.

Graphic code recognition operations on the target image may be different in different application scenarios. In one implementation, in a code-scanning recognition scenario, the graphic code recognition operation may be a camera shooting operation; and in a long press recognition scenario, the graphic code recognition operation is a long press operation on a picture.

The graphic code position information is used for uniquely representing positions of the graphic codes in the target image. In a possible implementation, the graphic code position information includes coordinates of a preset mark point in a graphic code, for example, the graphic code position information includes coordinates of a top left vertex of the graphic code or coordinates of a center point of the graphic code.

In one implementation, the graphic code position information further includes size information of the graphic codes. For example, height information and width information of the graphic codes.

In one implementation, in addition to obtaining the graphic code position information of the graphic codes, the terminal further obtains graphic code types of the graphic codes to subsequently perform, according to the types of the graphic codes, decoding by using a corresponding decoder without trying various types of decoders.

Step 403. Determine a target graphic code indicated by the graphic code recognition operation according to the graphic code position information, the target graphic code belonging to the at least two graphic codes.

Generally, a recognition position indicated by the graphic code recognition operation is usually close to or inclined to be a target graphic code that a user expects to recognize. Therefore, in a possible implementation, this step includes the following steps.

1. Determine a target recognition position indicated by the graphic code recognition operation.

In one implementation, the target recognition position is represented in a form of coordinates.

2. Determine a target graphic code according to the target recognition position and the graphic code position information.

In one implementation, the terminal calculates distances between the target recognition position and the graphic codes according to the target recognition position and the graphic code position information, and determines a graphic code corresponding to the shortest distance as the target graphic code.

Step 405. Display a target graphic code recognition result corresponding to the target graphic code.

In a possible implementation, the terminal recognizes the graphic codes to obtain at least two graphic code recognition results and finally displays the target graphic code recognition result corresponding to the target graphic code.

In another possible implementation, the terminal only recognizes the determined target graphic code and displays the obtained target graphic code recognition result.

For the graphic code recognition process, as shown in FIG. 3, for a recognized graphic code, the terminal obtains a size of the graphic code and detects whether the size is larger than a preset size (for example, 300 px×300 px). If the size is larger than the preset size, the graphic code is determined as a large image and the large image is downsampled to make a size of the downsampled graphic code be the preset size; and if the size is smaller than the preset size, the graphic code is determined as a small image and the small image is upsampled (e.g., a super-resolution sampling may be used) to make a size of the upsampled graphic code be the preset size. Because the size of the graphic code in the image can be determined with the help of target detection, the terminal may perform targeted sampling according to the size of the graphic code without performing sampling a plurality of times by using the pyramid sampling method, thereby reducing a volume of data processing in the recognition process. For example, in FIG. 2, the terminal needs to sample the to-be-recognized image a plurality of times, while in FIG. 3, the terminal only needs to perform a single small-image upsampling on the image.

After the graphic code is sampled, the terminal further performs image binarization processing on the graphic code. Instead of performing image binarization processing on the entire image, in this embodiment, the terminal only needs to perform image binarization processing on the extracted graphic code, thereby reducing a volume of data processing in a binarization process.

After the image binarization processing is completed, the terminal decodes the binarized graphic code. Because during the target detection, the graphic code type of the graphic code may be obtained, the terminal may perform targeted decoding by using a decoder according to the graphic code type without trying various decoders, thereby reducing a volume of data processing and computing resource consumption in a decoding process. For example, in FIG. 2, the terminal needs to try up to three decoders for decoding, whereas in FIG. 3, the terminal directly decodes the graphic code by using the two-dimensional barcode decoder.

Based on the description above, in this embodiment of this disclosure, when a graphic code recognition operation on a target image including at least two graphic codes is received, graphic code position information of the graphic codes in the target image is first obtained, and then, a target graphic code indicated by the graphic code recognition operation is determined according to the graphic code position information, thereby displaying a target graphic code recognition result corresponding to the target graphic code; and with the help of a graphic code position recognition mechanism, the terminal can simultaneously recognize a plurality of graphic codes in one image, thereby determining, according to positions of the graphic codes, the target graphic code that meets a recognition intention of a user, and further returning the recognition result of the target graphic code, so that efficiency of graphic code recognition is improved, and a problem of relatively low efficiency of graphic code recognition in the related art is resolved. In particular, the problem is caused by an image including at least two graphic codes, as a user needs to manually capture a specific graphic code that is expected to be recognized from the image, then perform graphic code recognition.

In different application scenarios, the terminal may determine the target graphic code in the at least two graphic codes in different manners. The following two embodiments are used to describe a target graphic code determining process in the long press recognition scenario and a target graphic code determining process in the code-scanning recognition scenario, respectively.

Figure 5:
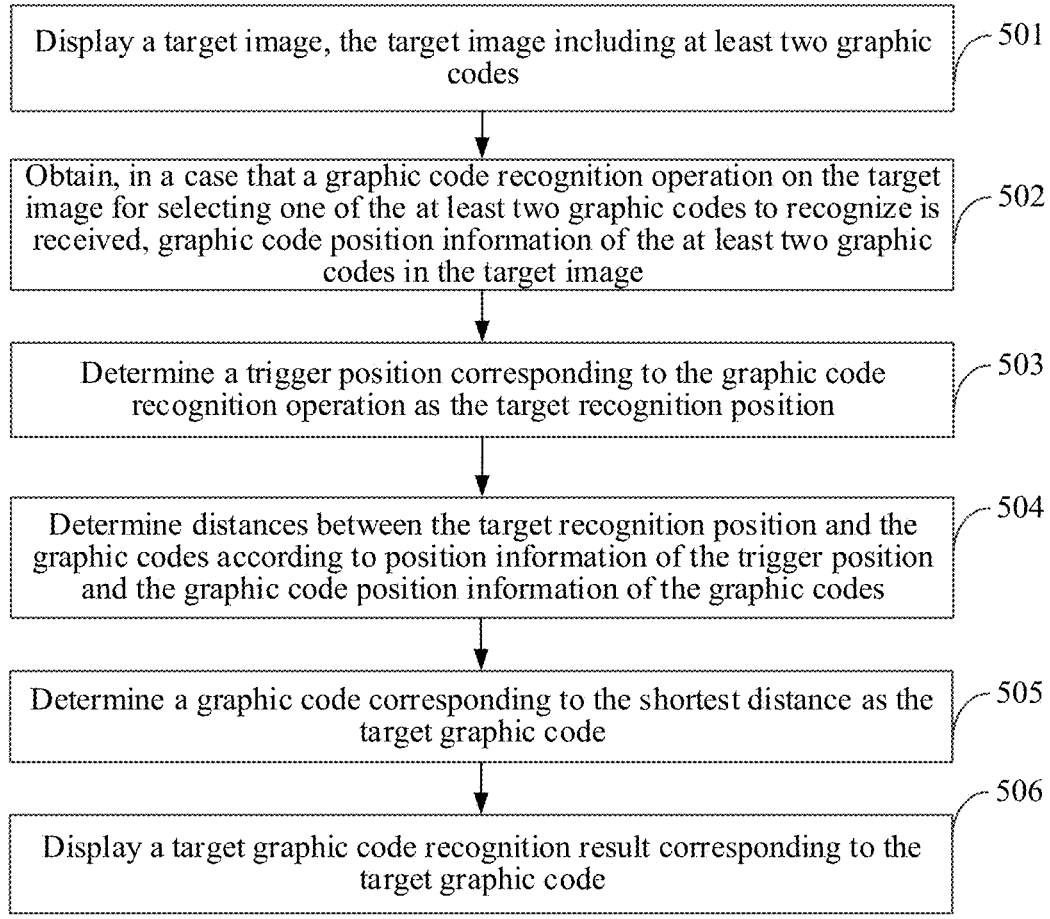
FIG. 5 shows a flowchart of a graphic code recognition method in a long press recognition scenario according to an embodiment of this disclosure.

FIG. 5 shows a flowchart of a graphic code recognition method according to another embodiment of this disclosure. In this embodiment, the method is applied to the long press recognition scenario. The method may include the following steps.

Step 501. Display a target image, the target image including at least two graphic codes.

Figure 6:
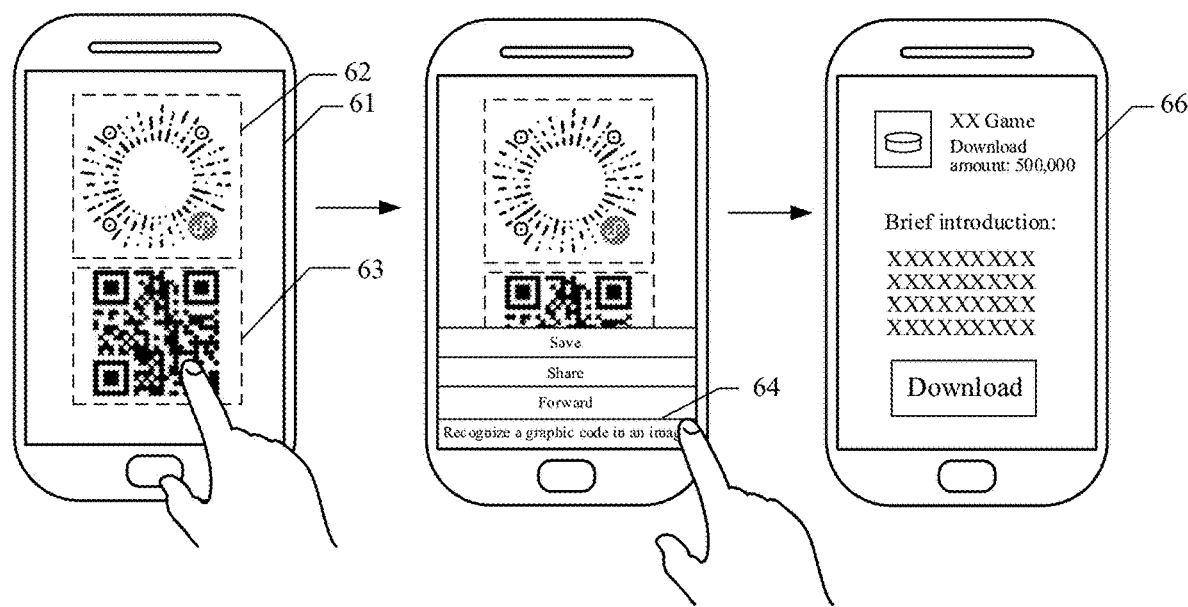
FIG. 6 is a schematic interface diagram of an implementation process of the graphic code recognition method shown in FIG. 5.

In this embodiment, the target image is a picture displayed by a terminal. For example, as shown in FIG. 6, the terminal displays a target image 61, and the target image 61 includes a radial two-dimensional barcode 62 and a dot two-dimensional barcode 63. In one implementation, the picture may be pre-captured or stored in the terminal.

Step 502. Obtain, when a graphic code recognition operation on the target image is received, graphic code position information of the graphic codes in the target image.

In this embodiment, the graphic code recognition operation is a trigger operation on the target image.

In a possible implementation, if the terminal is a mobile terminal having a touch function, when receiving a long press operation on the target image, the terminal displays several operation options, and when receiving a selection operation on a graphic code recognition option, the terminal determines that a graphic code recognition operation is received.

For example, as shown in FIG. 6, after receiving a long press operation on the target image 61, the terminal displays an operation option menu, and when receiving a selection operation on a graphic code recognition option 64, the terminal determines that a graphic code recognition operation is received. Optionally, the selection operation may be performed by touching the displayed option.

In other possible implementations, the terminal is a terminal that includes an external input device (e.g, a mouse), for example, a PC. When receiving a click operation (performed by the external input device) on the target image, the terminal displays several operation options, and when receiving a selection operation on a graphic code recognition option, the terminal determines that a graphic code recognition operation is received.

Step 503. Determine a trigger position corresponding to the graphic code recognition operation as the target recognition position.

In the long press recognition scenario, the user usually performs a long press operation on a to-be-recognized graphic code. Therefore, in a possible implementation, the terminal determines the trigger position (e.g., a long press position) corresponding to the graphic code recognition operation as the target recognition position.

Figure 7:
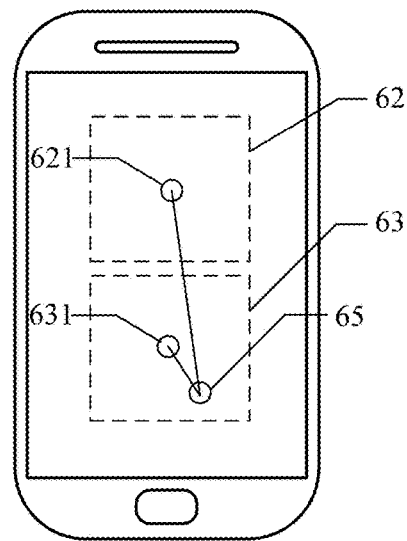
FIG. 7 is a schematic diagram of implementation when a distance between a graphic code and a target recognition position is determined.

For example, as shown in FIG. 7, the terminal determines a long press position at which a long press signal is received as a target recognition position 65.

In an embodiment, to facilitate subsequent calculation of distances between the graphic codes and the target recognition position, the terminal obtains coordinates of the target recognition position on the target image. For example, the coordinates of the target recognition position obtained by the terminal are $(x_{pos}, y_{pos})$.

In one implementation, when a function of long pressing and recognizing a graphic code is used for the first time, the terminal displays prompt information to instruct the user the option of long pressing the graphic codes at different positions for recognition. This is not limited in this embodiment.

Step 504. Determine distances between the target recognition position and the graphic codes according to position information of the trigger position and the graphic code position information of the graphic codes.

In one implementation, for the recognized graphic codes, the terminal calculates code centers of the graphic codes according to the graphic code position information of the graphic codes, and calculates the distances between the target recognition position and the graphic codes according to coordinates of the trigger position and coordinates of the code centers.

In a possible implementation, the terminal calculates code center coordinates of the graphic codes according to vertex coordinates of vertices in the graphic code position information; or the terminal calculates code centers of the graphic codes according to vertex coordinates of at least one vertex in the graphic code position information and size information of the graphic codes. This application does not limit the manner of calculating the code center coordinates.

For example, as shown in FIG. 7, coordinates of a first code center 621 of the radial two-dimensional barcode 62 obtained by the terminal is $(x_1, y_1)$, coordinates of a second code center 631 of the dot two-dimensional barcode 63 is $(x_2, y_2)$, a calculated distance $s_1$ between the target recognition position 65 and the radial two-dimensional barcode 62 is $\sqrt{(x_1-x_{pos})^2+(y_1-y_{pos})^2}$, and a calculated distance $s_2$ between the target recognition position 65 and the dot two-dimensional barcode 63 is $\sqrt{(x_2-x_{pos})^2+(y_2-y_{pos})^2}$.

Step 505. Determine a graphic code corresponding to the shortest distance as the target graphic code.

Further, the terminal determines a graphic code corresponding to the shortest distance as the target graphic code, that is, the graphic code that is closest to the target recognition position is determined as the target graphic code.

For example, as shown in FIG. 7, because $s_1 < s_2$, the terminal determines the dot two-dimensional barcode 63 as the target graphic code.

Step 506. Display a target graphic code recognition result corresponding to the target graphic code.

For example, as shown in FIG. 6, the terminal performs the graphic code recognition on the dot two-dimensional barcode 63. An obtained target graphic code recognition result is a game download link, so that a game download interface 66 is jumped to and displayed according to the game download link.

In this embodiment, the terminal determines the trigger position corresponding to the graphic code recognition operation as the target recognition position, and determines the target graphic code indicated by the user by calculating the distances between the target recognition position and the graphic codes, thereby recognizing the graphic code at the long press position in the target image in the long press recognition scenario. Optionally, the long press operation on the terminal may or may not be within a graphic code area (i.e., inside or outside the graphic code) and the distance calculated as described above may be used to determine the target graphic code.

Figure 8:
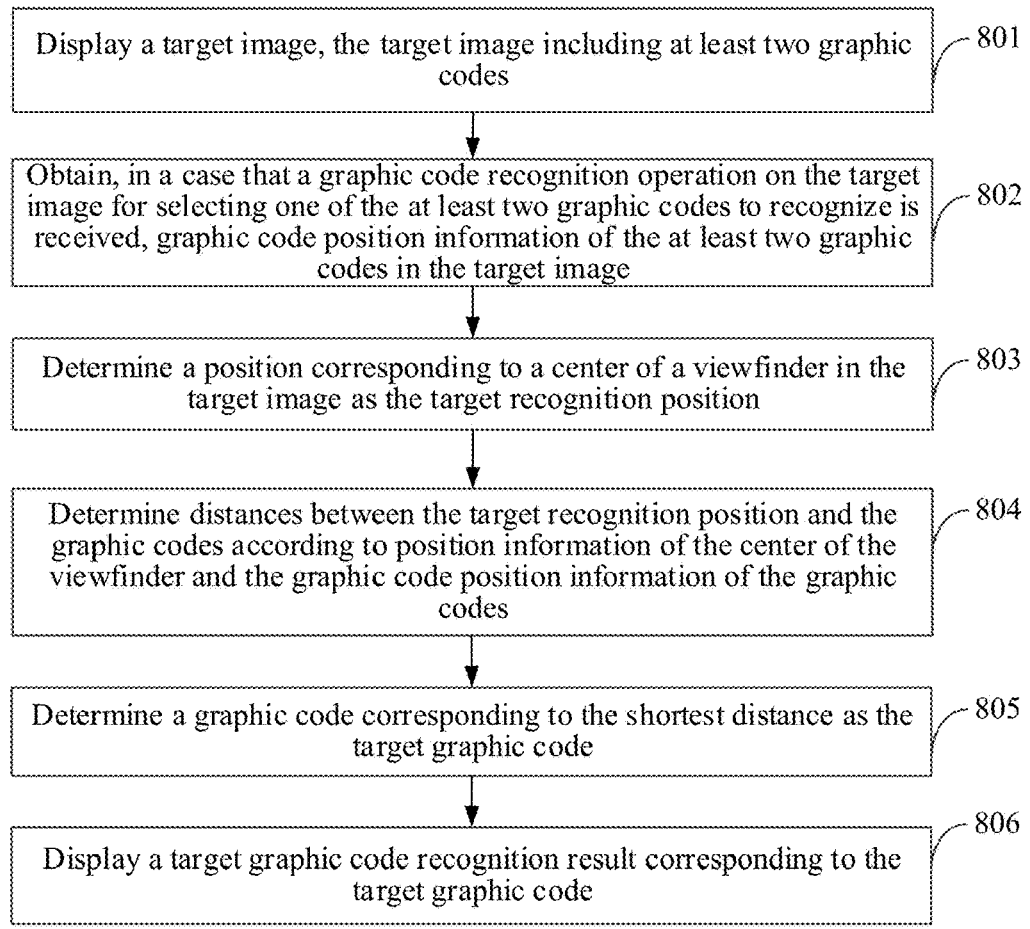
FIG. 8 shows a flowchart of a graphic code recognition method in a code-scanning recognition scenario according to an embodiment of this disclosure.

FIG. 8 shows a flowchart of a graphic code recognition method according to another embodiment of this disclosure. This embodiment is described by using an example in which the method is applied in the code-scanning recognition scenario. The method may further include the following steps.

Step 801. Display a target image, the target image including at least two graphic codes.

Figure 9:
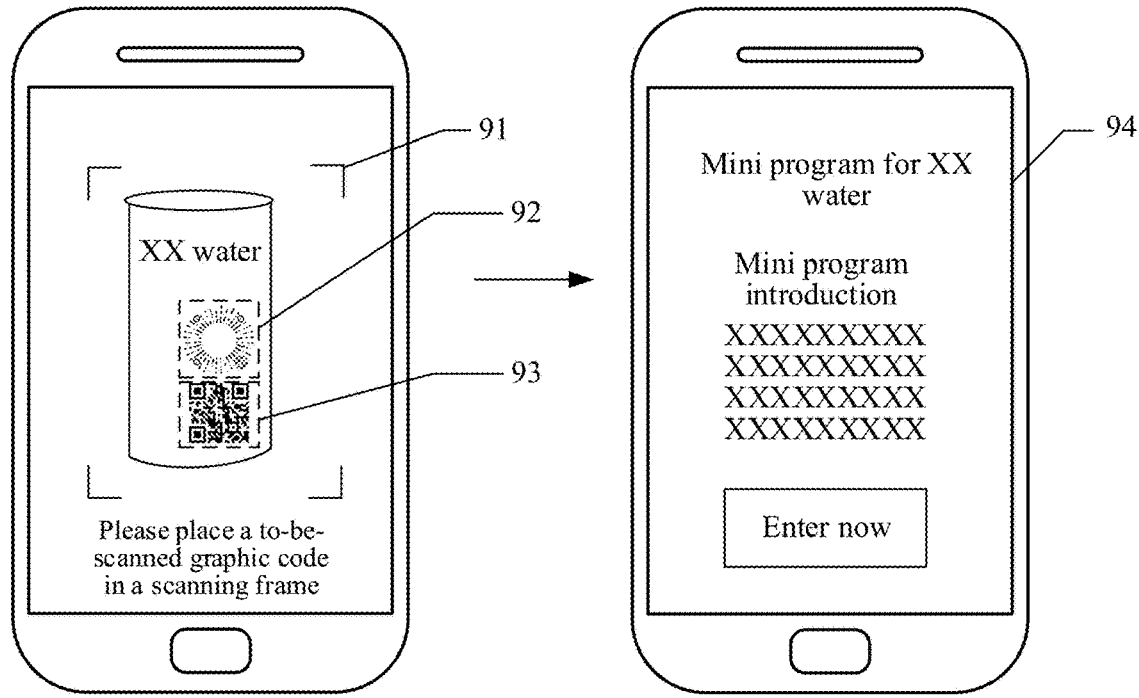
FIG. 9 is a schematic interface diagram of an implementation process of the graphic code recognition method shown in FIG. 8.

In this embodiment, the target image may be an image displayed in a viewfinder. For example, as shown in FIG. 9, after the terminal enables a code-scanning recognition function, the target image captured by a camera is displayed in a viewfinder 91, and the target image includes a radial two-dimensional barcode 92 and a dot two-dimensional barcode 93.

Step 802. Obtain, in a case that a graphic code recognition operation on the target image is received, graphic code position information of the graphic codes in the target image.

In this embodiment, the graphic code recognition operation is a photo-shooting operation on the target image.

In a possible implementation, a photo-shooting control is displayed in a terminal interface. When a click operation on the photo-shooting control is received, the terminal determines that a graphic code recognition operation is received.

In other possible implementations, when it is detected that the terminal remains stable for a duration that reaches a duration threshold (for example, 0.5 s), the terminal determines that a graphic code recognition operation is received. This is not limited in this embodiment of this disclosure.

Step 803. Determine a position corresponding to a center of a viewfinder in the target image as the target recognition position.

In the code-scanning recognition scenario, the user usually moves the terminal to make the to-be-recognized target graphic code be located at or close to the center of the viewfinder. Therefore, in a possible implementation, the terminal determines a position corresponding to the center of the viewfinder as the target recognition position.

For example, coordinates of the target recognition position determined by the terminal are ($x_{pos}$, $y_{pos}$).

Step 804. Determine distances between the target recognition position and the graphic codes according to position information of the center of the viewfinder and the graphic code position information of the graphic codes.

In one implementation, the terminal calculates code centers of the graphic codes according to the graphic code position information of the graphic codes, and calculates the distances between the target recognition position and the graphic codes according to coordinates of the center of the viewfinder and coordinates of the code centers. For a process of calculating the distances between the target recognition position and the graphic codes, reference may be made to step 504, and details are not described in this embodiment again.

Step 805. Determine a graphic code corresponding to the shortest distance as the target graphic code.

Further, the terminal determines the graphic code corresponding to the shortest distance as the target graphic code, that is, the graphic code that is closest to the center of the viewfinder is determined as the target graphic code.

For example, as shown in FIG. 9, a distance between the radial two-dimensional barcode 92 and the center of the viewfinder is less than a distance between the dot two-dimensional barcode 93 and the center of the viewfinder, the terminal determines the radial two-dimensional barcode 92 as the target graphic code.

Step 806. Display a target graphic code recognition result corresponding to the target graphic code.

For example, as shown in FIG. 9, the terminal performs graphic code recognition on the radial two-dimensional barcode 92. An obtained target graphic code recognition result may be a mini program jump information or a redirect information, so that a mini program interface 94 is jumped to and displayed according to the mini program jump information.

The mini program is an application that can be used without being downloaded and installed. Developers may develop corresponding mini programs for applications of the terminal. The mini programs may be embedded in the applications of the terminal as sub-applications. More diversified services may be provided for the user by running the mini programs in the applications.

In this embodiment, the terminal determines the center of the viewfinder as the target recognition position, and determines the target graphic code that the user expects to scan by calculating the distances between the target recognition position and the graphic codes, thereby recognizing a specified graphic code in a plurality of graphic codes in the viewfinder in the code-scanning recognition scenario.

In a possible implementation, a pre-trained target detection model is stored in the terminal. The target detection model is obtained through deep learning training, and is configured to recognize graphic codes in an image and output position information of the graphic codes in the image. Correspondingly, in the foregoing embodiments, when the terminal obtains the graphic code position information of the graphic codes in the target image, the following steps may be included.

1. Input the target image into the target detection model to obtain predicted graphic code position information and position confidences of the graphic codes, the target detection model being obtained through deep learning training.

A higher position confidence indicates a higher probability that the position specified by the predicted position information is a graphic code. Otherwise, a probability that the position specified by the predicted position information is a graphic code is lower. In an embodiment, the predicted position information includes coordinates of a specified mark point in the graphic code. The specified mark point may be a vertex or a center of the graphic code, or the like.

In a possible implementation, the target detection model includes i residual networks that are connected in series and a dilated convolutional neural network. For example, as shown in FIG. 10, the target detection model includes three residual networks that are connected in series and a dilated convolutional neural network, which are a first residual network 1010, a second residual network 1020, a third residual network 1030, and a dilated convolutional neural network 1040.

Each residual network includes a downsampling block and j first residual blocks. The downsampling block is configured to downsample inputted content to obtain image features. The first residual blocks are basic blocks in the residual network, and usually include a residual branch and a short-cut branch. The residual branch is configured to perform non-linear transformation on an input of the residual block, and the short-cut branch is configured to perform identity transformation or linear transformation on the input of the residual block.

In one implementation, the quantities of the first residual block included in each of the residual networks may be the same or different.

Figure 10:
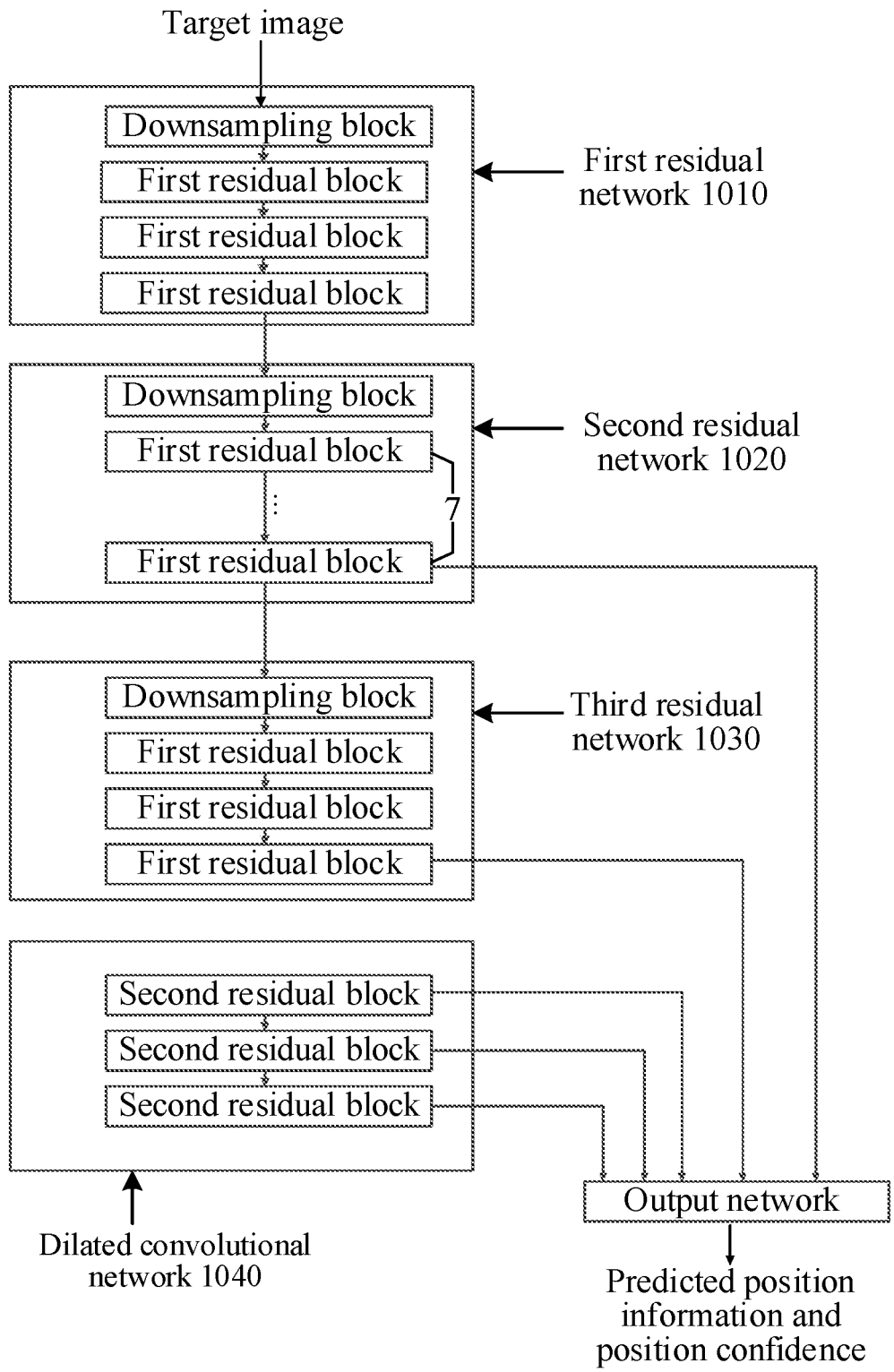
FIG. 10 is a schematic structural diagram of a target retrieval model according to an embodiment of this disclosure.

For example, as shown in FIG. 10, the first residual network 1010 includes three first residual blocks, the second residual network 1020 includes seven first residual blocks, and the third residual network 1030 includes three first residual blocks.

In one implementation, the first residual block may be a conventional residual block or a bottleneck residual block.

When the first residual block is a conventional residual block or a bottleneck residual block, for features inputted to the first residual block, convolution processing is performed in each of the convolutional layers. Parameters and calculation of residual networks are concentrated in the convolutional layer. To further reduce a size of the entire target detection model and make it applicable to the terminal, in a possible implementation, some convolutional layers in the first residual block are replaced with depthwise convolutional layers to reduce a size of the residual network and improve a processing speed of the residual network while ensuring accuracy of recognition.

Figure 11:
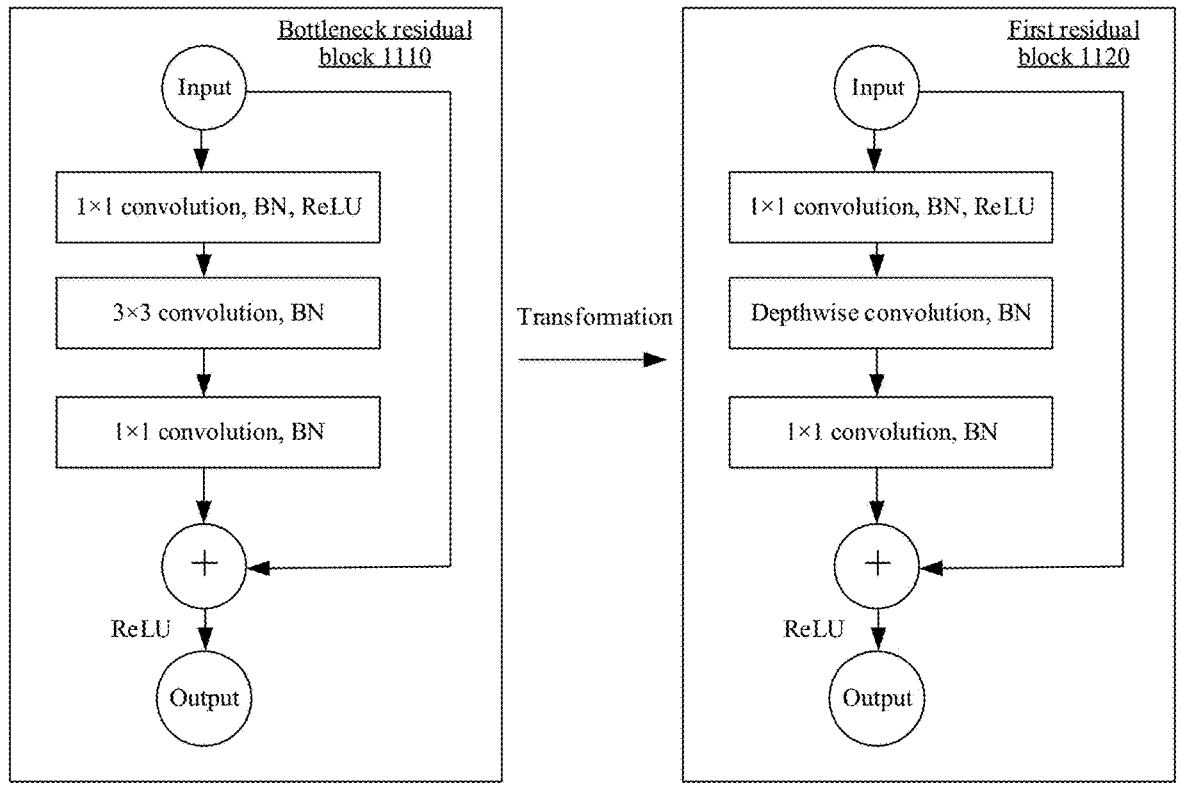
FIG. 11 is a schematic structural diagram of a first residual block according to an embodiment of this disclosure.

For example, as shown in FIG. 11, a bottleneck residual block 1110 includes three convolutional layers, where the first convolutional layer includes a plurality of 1×1 convolution kernels, the second convolutional layer includes a plurality of 3×3 convolution kernels, and the third convolutional layer includes a plurality of 1×1 convolution kernels. Each convolutional layer includes a batch normalization (BN) layer, and both the first convolutional layer and a final output include a rectified linear unit (ReLU). When the bottleneck residual block 1110 is transformed, after the 3×3 convolution kernels in the second convolutional layer are transformed into depthwise convolution kernels, a first residual block 1120 is obtained.

A dilated convolution (also referred to as atrous convolution) is a convolution manner of injecting dilations between the convolution kernels. Compared with an ordinary convolution, the dilated convolution introduces a hyperparameter referred to as "dilation rate". The parameter defines an interval between values when the convolution kernels process data. Through dilated convolution processing, on one hand, a spatial scale of the image features can be kept unchanged, thereby avoiding loss of information caused by reducing information of pixels of the image features, and on the other hand, a receptive field can be expanded, thereby implementing a more accurate target detection. The receptive field is a size of an area that is of pixels in a feature image outputted by a hidden layer in a neural network and that is mapped to an original image. A larger receptive field of the pixels in the original image indicates that a larger range thereof mapped to the original image, and means that the pixels may include features that are more global and that have a higher semantic level.

In one implementation, the dilated convolutional neural network includes k second residual blocks. For example, as shown in FIG. 10, the dilated convolutional neural network includes three second residual blocks.

In a possible implementation, in the second residual blocks, the receptive field is expanded by using the dilated convolutions. In addition, to avoid underlying features from being directly used as upper-level features and causing that the upper-level features cannot obtain a higher semantic level and a visual receptive field, the short-cut branch in the second residual block further includes a convolution transformation.

Figure 12:
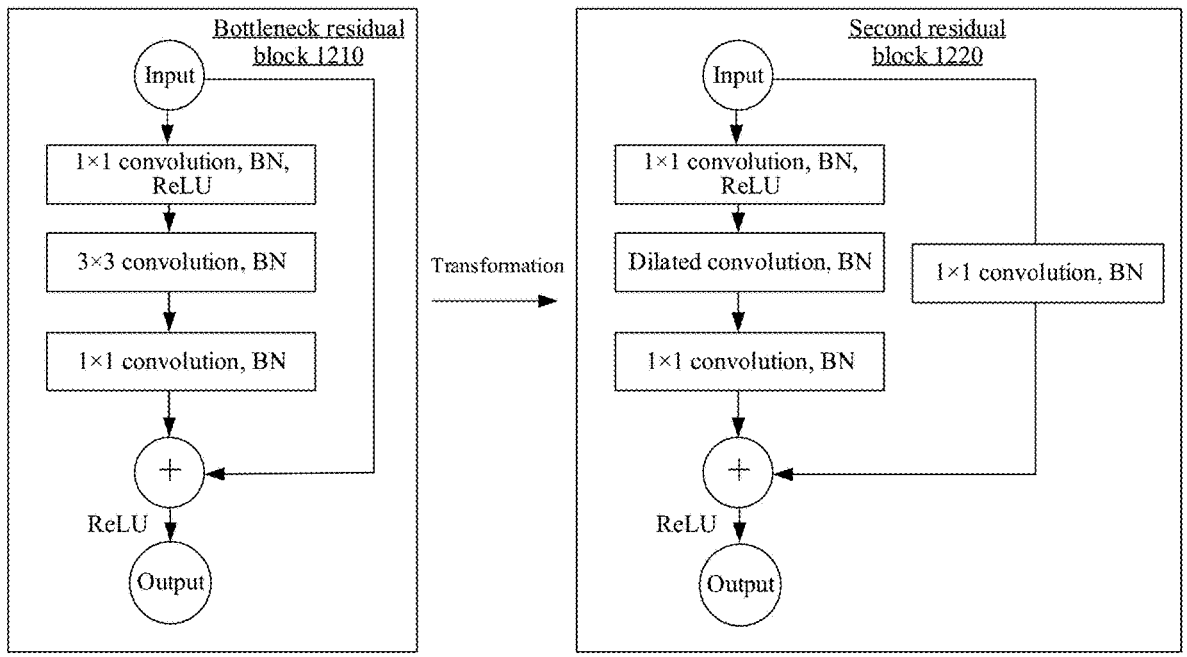
FIG. 12 is a schematic structural diagram of a second residual block according to an embodiment of this disclosure.

For example, as shown in FIG. 12, a bottleneck residual block 1210 includes three convolutional layers, where the first convolutional layer includes a plurality of 1×1 convolution kernels, the second convolutional layer includes a plurality of 3×3 convolution kernels, the third convolutional layer includes a plurality of 1×1 convolution kernels, each convolutional layer includes a BN layer, and the first convolutional layer and a final output both include a ReLU. When the bottleneck residual block 1210 is transformed, the 3×3 convolution kernels in the second convolutional layer are transformed into dilated convolution kernels, and a convolutional layer including a plurality of 1×1 convolution kernels is added to the short-cut branch to finally obtain a second residual block 1220.

In this embodiment of this disclosure, an output of the first residual block at the end of the residual network and an output of each second residual block in the dilated convolutional neural network are all inputted to an output network, and are classified and regressed by the output network to improve accuracy of a subsequent classification result.

For example, as shown in FIG. 10, outputs of the first residual block at the end of the second residual network 1020, the first residual block at the end of the third residual network 1030, and the each second residual block in the dilated convolutional neural network 1040 are all inputted in the output network.

2. Determine the graphic code position information of the graphic codes according to the predicted graphic code position information and the position confidences.

In a possible implementation, the terminal determines the predicted graphic code position information having the position confidence that is greater than a confidence threshold (for example, 90%) as the graphic code position information of the graphic codes according to the position confidence corresponding to the predicted graphic code position information.

In this embodiment of this disclosure, in addition to predicting the positions of the graphic codes, the target detection model may further predict graphic code types of the graphic codes. Correspondingly, when the graphic code recognition is subsequently performed, the terminal performs decoding by using a graphic code decoder corresponding to the graphic code type, thereby improving decoding efficiency.

In a possible implementation, the terminal obtains a predicted graphic code type and a type confidence that are outputted by the target detection model, and determines the graphic code types of the graphic codes according to the predicted graphic code type and the type confidence. The graphic code types include at least one of a one-dimensional code or a two-dimensional barcode.

In one implementation, the terminal determines the predicted graphic code types having a graphic code type confidence greater than a confidence threshold (for example, 90%) as the graphic code types of the graphic codes according to the graphic code type confidences corresponding to the predicted graphic code types.

Figure 13:
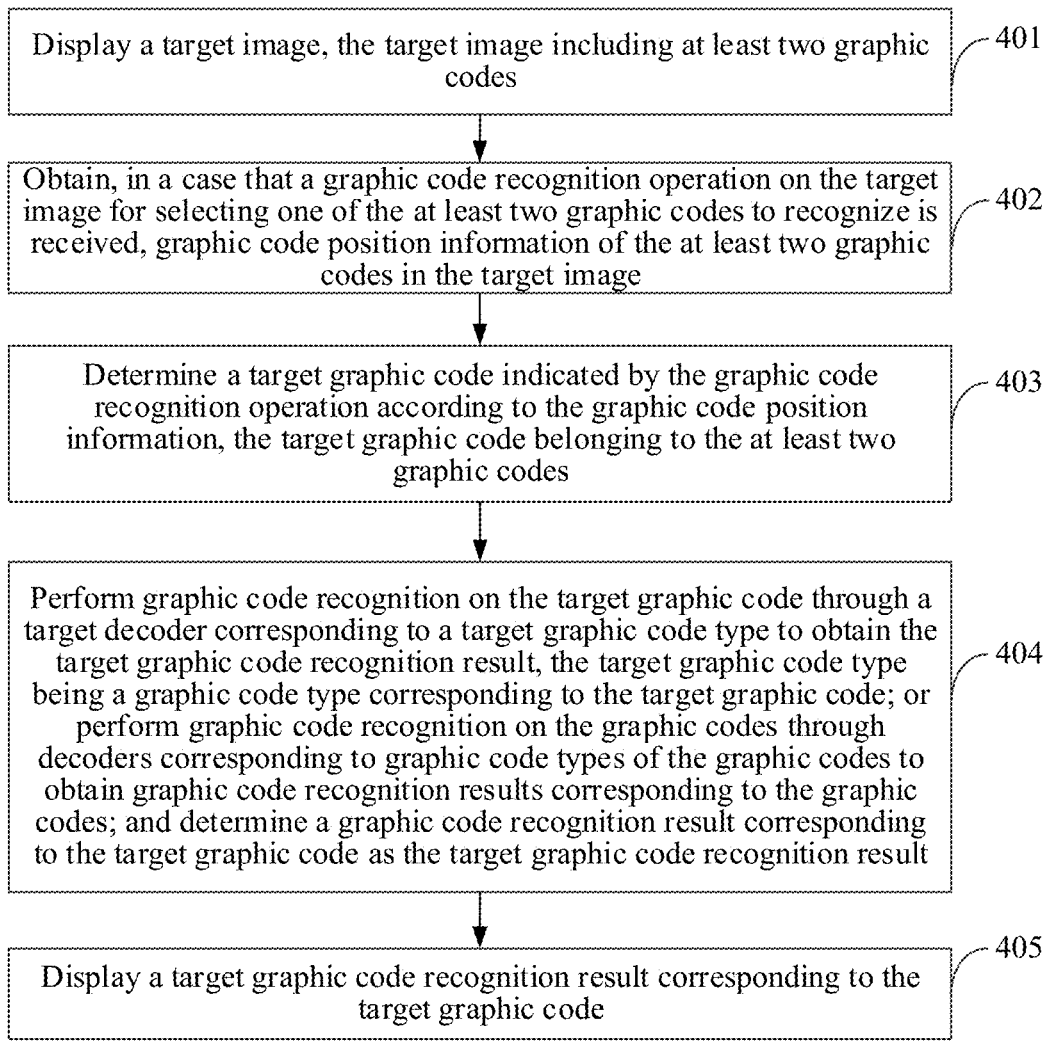
FIG. 13 shows a flowchart of a graphic code recognition method according to another embodiment of this disclosure.

Correspondingly, based on FIG. 4, as shown in FIG. 13, the following steps are further included before step 405.

Step 404. Perform graphic code recognition on the target graphic code through a target decoder corresponding to a target graphic code type to obtain the target graphic code recognition result, the target graphic code type being a graphic code type corresponding to the target graphic code; or perform graphic code recognition on the graphic codes through decoders corresponding to graphic code types of the graphic codes to obtain graphic code recognition results corresponding to the graphic codes; and determine a graphic code recognition result corresponding to the target graphic code as the target graphic code recognition result.

In one implementation, the terminal extracts the target graphic code from the target image according to the graphic code position information outputted by the target detection model, and performs, by using the target decoder, graphic code recognition on the target graphic code according to the target graphic code type corresponding to the target graphic code, thereby obtaining the target graphic code recognition result corresponding to the target graphic code.

In one implementation, for a non-target graphic code in the target image, the terminal does not need to perform graphic code recognition, thereby reducing a volume of data processing when the terminal recognizes a graphic code.

In another possible implementation, the terminal extracts the graphic codes from the target image according to the graphic code position information outputted by the target detection model, and performs, by using corresponding decoders, graphic code recognition on the graphic codes according to the graphic code types corresponding to the graphic codes, thereby obtaining the graphic code recognition results corresponding to the graphic codes. Further, the terminal determines a graphic code recognition result corresponding to the target graphic code as the target graphic code recognition result for subsequent display.

Compared with the related art in which various decoders need to be tried to perform graphic code recognition, in this embodiment, the terminal performs, by using corresponding decoders, targeted graphic code recognition according to the recognized graphic code types, thereby improving recognition efficiency and reducing a volume of data processing during recognition.

Figure 14:
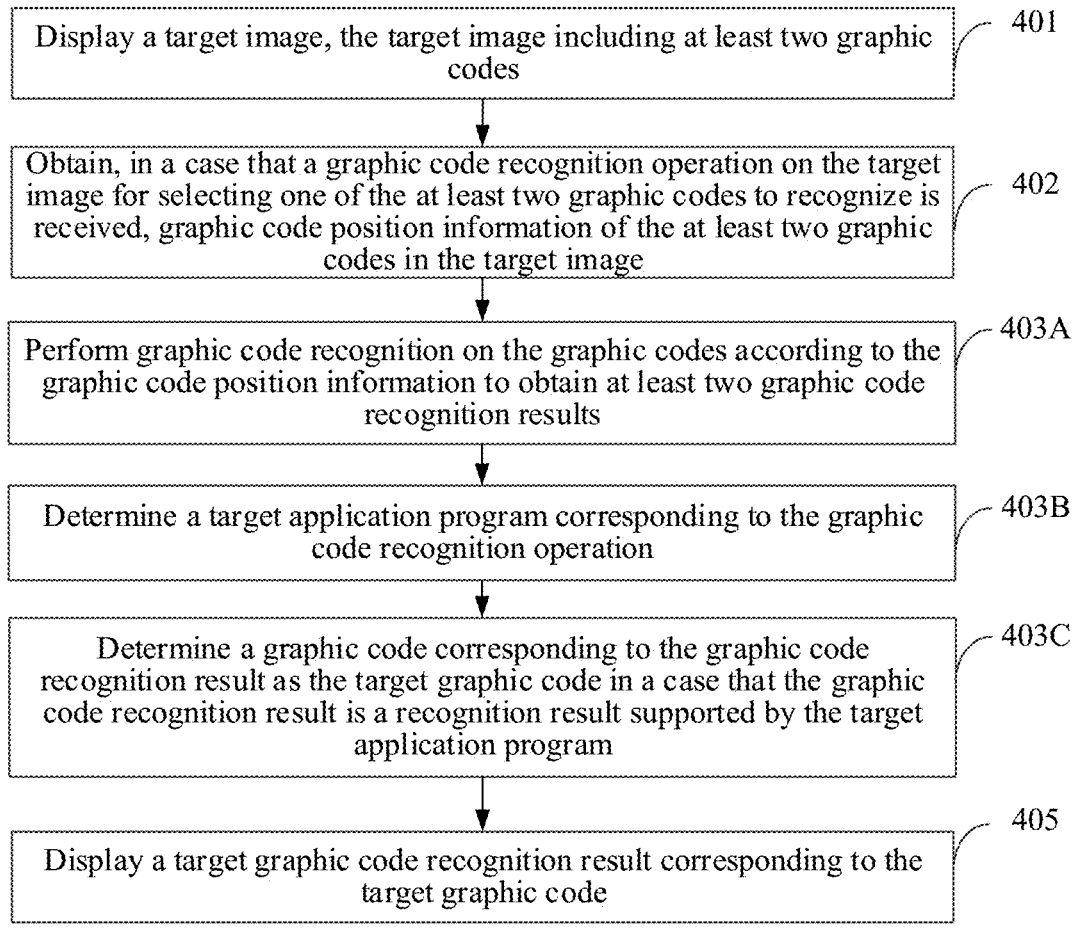
FIG. 14 shows a flowchart of a graphic code recognition method according to another embodiment of this disclosure.

In addition to determining the target graphic code according to the position information of the graphic codes, in another possible implementation, the terminal may further determine the target graphic code that the user expects to recognize according to the graphic code recognition results corresponding to the graphic codes in the target image. In an embodiment, based on FIG. 4, as shown in FIG. 14, step 403 may include the following steps.

Step 403A. Perform graphic code recognition on the graphic codes according to the graphic code position information to obtain at least two graphic code recognition results.

The terminal extracts the graphic codes from the target image according to the graphic code positions corresponding to the graphic codes, and performs graphic code recognition on the graphic codes to obtain the graphic code recognition results corresponding to the graphic codes.

Step 403B. Determine a target application program corresponding to the graphic code recognition operation.

In a possible implementation, the target application program may be the same application program that receives the graphic code recognition operation, and the graphic code recognition operation may be initiated from the target application program.

For example, when a graphic code is scanned by using a graphic code recognition function of an instant messaging application program A, the instant messaging application program A is determined as the target application program.

Step 403C. Determine a graphic code corresponding to the graphic code recognition result as the target graphic code if the graphic code recognition result is a recognition result supported by the target application program.

In a possible implementation, types of the recognition results supported by different application programs in the terminal are different, and each application program creates and maintains its own recognition result list. The recognition result list includes types of recognition results supported by the application program.

In one implementation, when the graphic code recognition result is a recognition result supported by the target application program, the target application program may parse the graphic code recognition result. Otherwise, the target application program may not parse the graphic code recognition result.

For example, for the instant messaging application program A, a recognition result that is supported includes a payment page of a payment application B. When a code-scanning function of the instant messaging application program A is used to scan code, in a scanned image, if the graphic code recognition result corresponding to a first graphic code is the payment page of the payment application B, the graphic code recognition result corresponding to a second graphic code is a payment page of a payment application C, the terminal determines the graphic code recognition result corresponding to the first graphic code as the target graphic code recognition result, and determines the first graphic code as the target graphic code.

In one implementation, the recognition result list includes recognition result keywords. The terminal detects whether the graphic code recognition result includes a recognition result keyword based on the recognition result list. If the graphic code recognition result includes a recognition result keyword, it is determined that the graphic code recognition result is a recognition result supported by the current application program.

Subsequently, the terminal only displays the target graphic code recognition result without displaying other graphic code recognition results.

In an actual application, when a user makes a payment by scanning an image containing multiple payment barcodes with a terminal, the terminal may simultaneously capture multiple barcodes for payment corresponding to different payment applications via the scan. The payments applications may include WeChat pay, alipay, or the like. The terminal chooses a payment application supported by the application program that is used for current code scanning, and displays a recognition result of the two-dimensional barcode for payment corresponding to the payment application, to help the user make a quick payment in the current application program, thereby avoiding a problem that the payment cannot be made because the current application program does not support and display a payment page of another payment application.

The following is an apparatus embodiment of this disclosure that can be used for executing the method embodiments of this disclosure. For details not disclosed in the apparatus embodiment of this disclosure, reference may be made to the method embodiments of this disclosure.

Figure 15:
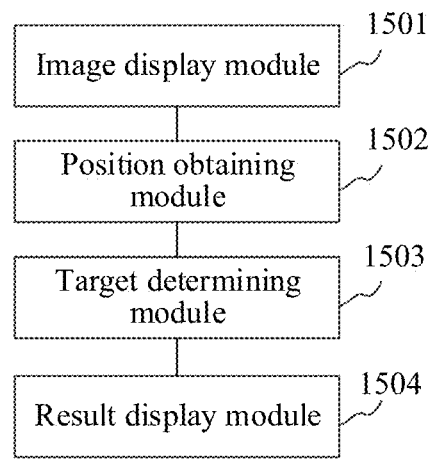
FIG. 15 shows a structural block of a graphic code recognition apparatus according to an embodiment of this disclosure.

FIG. 15 shows a structural block of a graphic code recognition apparatus according to an embodiment of this disclosure. The apparatus may be a terminal 120 in the implementation environment shown in FIG. 1, or may be disposed on the terminal 120. All or some of the modules or units included in the apparatus may be implemented entirely or partly by software, hardware, or a combination thereof. The apparatus may include:

an image display module 1501, configured to display a target image, the target image including at least two graphic codes;

a position obtaining module 1502, configured to obtain, when a graphic code recognition operation on the target image is received, graphic code position information of the graphic codes in the target image;

a target determining module 1503, configured to determine a target graphic code indicated by the graphic code recognition operation according to the graphic code position information, the target graphic code belonging to the at least two graphic codes; and a result display module 1504, configured to display a target graphic code recognition result corresponding to the target graphic code.

In one implementation, the target determining module 1503 includes:

a first determining unit, configured to determine a target recognition position indicated by the graphic code recognition operation; and a second determining unit, configured to determine the target graphic code according to the target recognition position and the graphic code position information.

In one implementation, the target image may be a picture, and the graphic code recognition operation may be a trigger operation on the picture.

The first determining unit is configured to determine a trigger position corresponding to the graphic code recognition operation as the target recognition position.

The second determining unit is configured to determine distances between the target recognition position and the graphic codes according to position information of the trigger position and the graphic code position information of the graphic codes; and determine a graphic code corresponding to the shortest distance as the target graphic code.

In one implementation, the target image is an image displayed in a viewfinder of the apparatus, and the graphic code recognition operation is a photo-shooting operation on the target image.

The first determining unit is configured to determine a position corresponding to a center of the viewfinder as the target recognition position.

The second determining unit is configured to determine distances between the target recognition position and the graphic codes according to position information of the center of the viewfinder and the graphic code position information of the graphic codes; and determine a graphic code corresponding to the shortest distance as the target graphic code.

In one implementation, the position obtaining module 1502 includes:

an input unit, configured to input the target image into a target detection model to obtain predicted graphic code position information and position confidences of the graphic codes; and a third determining unit, configured to determine the graphic code position information of the graphic codes according to the predicted graphic code position information and the position confidences.

In one implementation, the target detection model includes i residual networks that are connected in series and a dilated convolutional neural network, each of the residual networks including a downsampling block and j first residual blocks, the first residual block including a depth-wise convolutional layer; and the dilated convolutional neural network including k second residual blocks, the second residual block including a dilated convolutional layer, i, j, and k being integers greater than or equal to 2.

In one implementation, the apparatus may further include:

a type obtaining module, configured to obtain predicted graphic code types and type confidences of the graphic codes outputted by the target detection model; and a type determining module, configured to determine graphic code types of the graphic codes according to the predicted graphic code types and the type confidences, the graphic code types including at least one of a one-dimensional code or a two-dimensional barcode;

The apparatus may further include:

a first decoding module, configured to perform graphic code recognition on the target graphic code through a target decoder corresponding to a target graphic code type to obtain the target graphic code recognition result, the target graphic code type being a graphic code type corresponding to the target graphic code; or a second decoding module, configured to perform graphic code recognition on the graphic codes through decoders corresponding to graphic code types of the graphic codes to obtain graphic code recognition results corresponding to the graphic codes; and determine a graphic code recognition result corresponding to the target graphic code as the target graphic code recognition result.

In one implementation, the target determining module 1503 may further include:

a result recognition unit, configured to perform graphic code recognition on the graphic codes according to the graphic code position information to obtain at least two graphic code recognition results;

a fourth determining unit, configured to determine a target application program corresponding to the graphic code recognition operation; and a fifth determining unit, configured to determine a graphic code corresponding to the graphic code recognition result as the target graphic code if the graphic code recognition result is a recognition result supported by the target application program.

Based on the above, in this embodiment of this disclosure, when a graphic code recognition operation on a target image including at least two graphic codes is received, graphic code position information of the graphic codes in the target image is first obtained, and then, a target graphic code indicated by the graphic code recognition operation is determined according to the graphic code position information, thereby displaying a target graphic code recognition result corresponding to the target graphic code; and with the help of a graphic code position recognition mechanism, the terminal can simultaneously recognize a plurality of graphic codes in one image, thereby determining, according to positions of the graphic codes, the target graphic code that meets a recognition intention of a user, and further returning the recognition result of the target graphic code, so that efficiency of graphic code recognition is improved. In particular, the problem is caused by an image including at least two graphic codes, as a user needs to manually capture a specific graphic code that is expected to be recognized from the image, then perform graphic code recognition.

Figure 16:
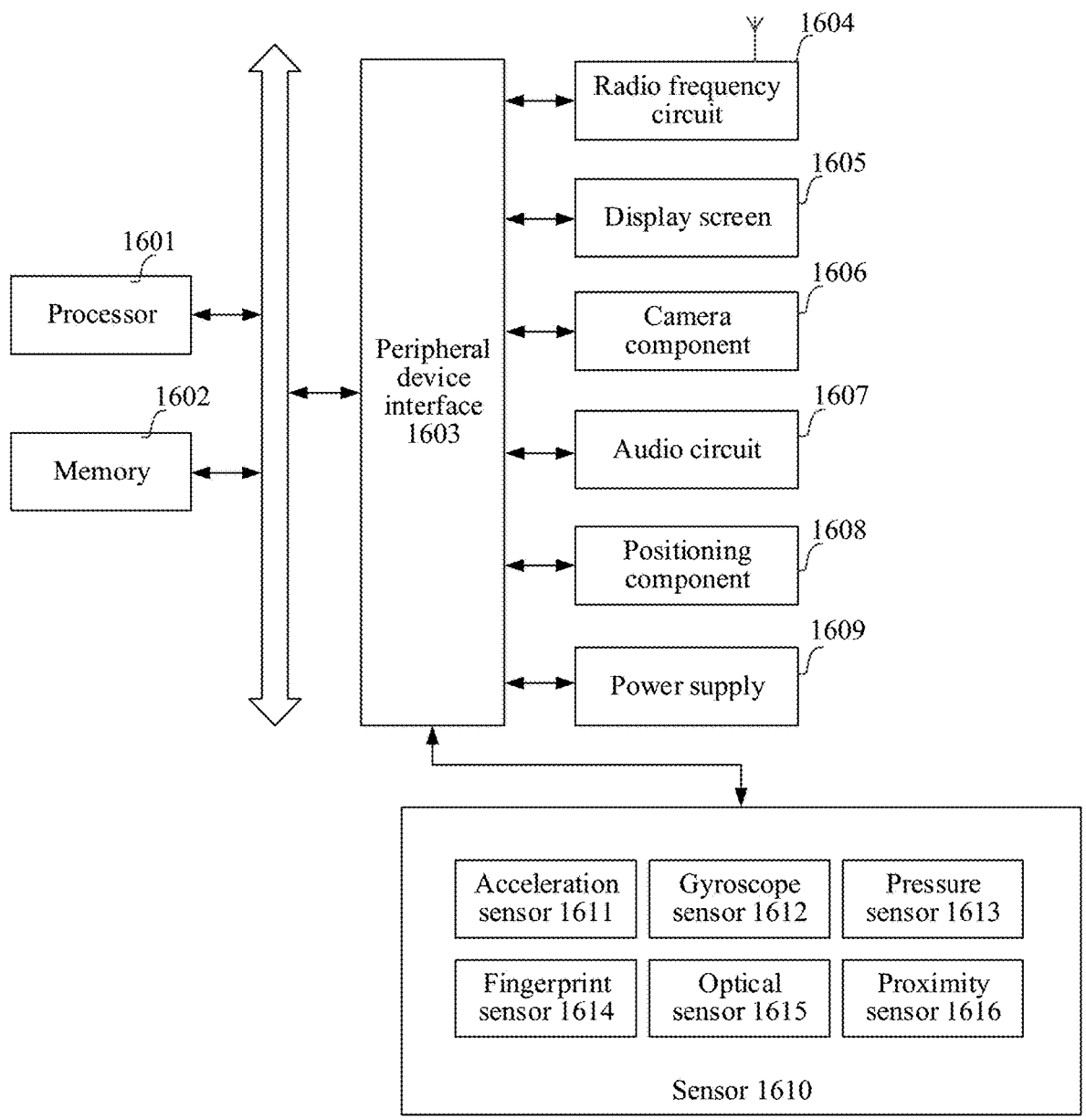
FIG. 16 shows a schematic structural diagram of a terminal according to an embodiment of this disclosure.

FIG. 16 shows a schematic structural diagram of a terminal according to an embodiment of this disclosure. The terminal may be implemented as a terminal 120 in the implementation environment shown in FIG. 1 to implement the graphic code recognition method provided by the foregoing embodiments. Specifically:

The terminal includes a processor 1601 and a memory 1602.

The processor 1601 may include one or more processing cores, and may be, for example, a 4-core processor or an 8-core processor. The processor 1601 may be implemented in at least one hardware form of a digital signal processor (DSP), a field-programmable gate array (FPGA), and a programmable logic array (PLA). The processor 1601 may alternatively include a main processor and a coprocessor. The main processor is a processor that is configured to process data in an awake state, also referred to as a central processing unit (CPU), and the coprocessor is a low-power processor that is configured to process data in an idle state. In some embodiments, the processor 1601 may be integrated with a graphics processing unit (GPU). The GPU is configured to be responsible for rendering and drawing content to be displayed by a display screen. In some embodiments, the processor 1601 may further include an artificial intelligence (AI) processor. The AI processor is configured to process a calculation operation related to machine learning.

The memory 1602 may include one or more computer-readable storage media. The computer-readable storage medium may be tangible and non-transient. The memory 1602 may further include a high-speed random access memory and a non-volatile memory, for example, one or more disk storage devices or flash memory devices. In some embodiments, the non-transient computer-readable storage medium in the memory 1602 is configured to store at least one computer-readable instruction, and the at least one computer-readable instruction is executed by the processor 1601 for implementing the graphic code recognition method in this application.

In some embodiments, the terminal may further optionally include a peripheral device interface 1603 and at least one peripheral device. Specifically, the peripheral device includes at least one of a radio frequency circuit 1604, a touch display screen 1605, a camera 1606, an audio circuit 1607, a positioning component 1608, and a power supply 1609.

The peripheral device interface 1603 may be configured to connect the at least one peripheral device related to input/output (I/O) to the processor 1601 and the memory 1602. In some embodiments, the processor 1601, the memory 1602, and the peripheral device interface 1603 are integrated on a same chip or circuit board. In some other embodiments, any one or two of the processor 1601, the memory 1602, and the peripheral device interface 1603 may be implemented on a separate chip or the circuit board. This is not limited in this embodiment.

The radio frequency circuit 1604 is configured to receive and transmit a radio frequency (RF) signal, also referred to as an electromagnetic signal. The RF circuit 1604 communicates with a communication network and another communication device by using the electromagnetic signal. The RF circuit 1604 converts an electric signal into an electromagnetic signal for transmission, or converts a received electromagnetic signal into an electric signal. In an embodiment, the RF circuit 1604 includes an antenna system, an RF transceiver, one or more amplifiers, a tuner, an oscillator, a digital signal processor, a code chip set, a subscriber identity module card, and the like. The RF circuit 1604 may communicate with other terminals through at least one wireless communication protocol. The wireless communication protocol includes, but is not limited to a world wide web, a metropolitan area network, an intranet, various generations of mobile communication networks (e.g., 2G, 3G, 4G, and 5G), a wireless local area network and/or a wireless fidelity (Wi-Fi) network. In some embodiments, the RF circuit 1604 may further include a circuit related to a near field communication (NFC) related circuit. This is not limited in this application.

The touch display screen 1605 is configured to display a user interface (UI). The UI may include a graphic, text, an icon, a video, and any combination thereof. The touch display screen 1605 also has a capability of collecting a touch signal on or above a surface of the touch display screen 1605. The touch signal may be used as a control signal to be inputted into the processor 1601 for processing. The touch display screen 1605 is configured to provide a virtual button and/or a virtual keyboard, which is also referred to as a soft button and/or a soft keyboard. In some embodiments, there may be one touch display screen 1605, disposed on a front panel of the terminal. In some other embodiments, there may be at least two touch display screens 1605, disposed on different surfaces of the terminal respectively or in a folded design. In some more embodiments, the touch display screen 1605 may be a flexible display screen, disposed on a curved surface or a folded surface of the terminal. Even, the touch display screen 1605 may be further set in a non-rectangular irregular pattern, namely, a special-shaped screen. The touch display screen 1605 may be made of a material such as a liquid crystal display (LCD) or an organic light-emitting diode (OLED).

The camera component 1606 is configured to capture an image or a video. In an embodiment, the camera component 1606 includes a front-facing camera and a rear-facing camera. Generally, the front-facing camera is configured to implement a video call or selfie-taking. The rear-facing camera is configured to shoot a picture or a video. In some embodiments, there are at least two rear-facing cameras, each of which is any one of a main camera, a depth of field camera and a wide-angle camera, so as to implement a background blurring function by fusing the main camera and the depth of field camera, and to implement panoramic shooting and virtual reality (VR) shooting functions by fusing the main camera and the wide-angle camera. In some embodiments, the camera component 1606 may further include a flash. The flash may be a single color temperature flash or a double color temperature flash. The double color temperature flash refers to a combination of a warm flash and a cold flash, and may be configured to perform light ray compensation at different color temperatures.

The audio circuit 1607 is configured to provide an audio interface between a user and the terminal. The audio circuit 1607 may include a microphone and a speaker. The microphone is configured to collect sound waves of a user and an environment, and convert the sound waves into electrical signals and input the electrical signals into the processor 1601 for processing, or input the electrical signals into the RF circuit 1604 to implement speech communication. For the purpose of stereo sound collection or noise reduction, there may be a plurality of microphones, respectively disposed at different parts of the terminal. The microphone may be further a microphone array or an omni-directional collection microphone. The speaker is configured to convert electrical signals from the processor 1601 or the RF circuit 1604 into sound waves. The speaker may be a conventional thin-film speaker or a piezoelectric ceramic speaker. When the speaker is the piezoelectric ceramic speaker, electrical signals not only can be converted into sound waves that can be heard by human, but also can be converted into sound waves that cannot be heard by human for ranging and the like. In some embodiments, the audio circuit 1607 may further include an earphone jack.

The positioning component 1608 is configured to position a current geographic location of the terminal, to implement a navigation or a location based service (LBS). The positioning component 1608 may be a positioning component based on the Global Positioning System (GPS) of the United States, the China's Beidou Navigation Satellite System (BDS), or the Galileo system of Russia.

The power supply 1609 is configured to supply power to components in the terminal. The power supply 1609 may be an alternating current, a direct current, a primary battery, or a rechargeable battery. In a case that the power supply 1609 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the terminal further includes one or more sensors 1610. The one or more sensors 1610 include, but are not limited to, an acceleration sensor 1611, a gyroscope sensor 1612, a pressure sensor 1613, a fingerprint sensor 1614, an optical sensor 1615, and a proximity sensor 1616.

A person skilled in the art may understand that a structure shown in FIG. 16 constitutes no limitation on the terminal, and the terminal may include more or fewer components than those shown in the figure, or some components may be combined, or a different component deployment may be used.

An embodiment of this disclosure further provides a non-transitory computer-readable storage medium, the non-transitory storage medium storing at least one computer-readable instruction, at least one program, a code set, or an computer-readable instruction set, the at least one computer-readable instruction, the at least one program, the code set, or the computer-readable instruction set being executed by the processor to implement the graphic code recognition method according to the foregoing embodiments.

This application further provides a computer program product including a computer-readable instruction, causing, when run on a computer, the computer to perform the graphic code recognition method according to the foregoing embodiments.

It is to be understood that although the steps in the flowcharts of the foregoing embodiments are displayed in order according to arrows, the steps are not necessarily performed in the order indicated by the arrows. Unless clearly stated herein, the steps are not performed strictly in the order, and the steps may be performed in other orders. Moreover, at least a part of the steps in the foregoing embodiments may include a plurality of sub-steps or a plurality of stages. The sub-steps or stages are not necessarily performed at the same moment, but may be performed at different moments. The sub-steps or stages are not necessarily performed successively in order, but may be performed in turn or alternately with at least a part of other steps or sub-steps or stages of other steps.

The sequence numbers of the foregoing embodiments of this disclosure are merely for the convenience of description, and do not imply the preference among the embodiments. A person of ordinary skill in the art may understand that all or some of the steps in a parameter configuration method of the wireless local area network of the foregoing embodiments may be implemented by hardware, or may be implemented by a program computer-readable instructing related hardware. The program may be stored in a non-transitory computer-readable storage medium. The non-transitory storage medium mentioned above may be a read-only memory, a magnetic disk, or an optical disc. The foregoing descriptions are merely exemplary embodiments of this disclosure, but are not intended to limit this application. Any modification, equivalent replacement, or improvement made without departing from the spirit and principle of this application falls within the protection scope of this application.

What is claimed is:

1. A method for graphic code recognition, performed by a terminal, the method comprising:
    displaying a target image, the target image comprising at least two graphic codes;
    in response to receiving a graphic code recognition operation on the target image for selecting one of the at least two graphic codes to recognize:
        inputting the target image into a target detection model to obtain predicted graphic code position information and position confidences of the at least two graphic codes; and
        determining the graphic code position information of the at least two graphic codes according to the predicted graphic code position information and the position confidences;
    determining a target graphic code indicated by the graphic code recognition operation according to the graphic code position information, the target graphic code belonging to the at least two graphic codes; and
    displaying a target graphic code recognition result corresponding to the target graphic code.

2. The method according to claim 1, wherein determining the target graphic code indicated by the graphic code recognition operation according to the graphic code position information comprises:
    determining a target recognition position indicated by the graphic code recognition operation; and
    determining the target graphic code according to the target recognition position and the graphic code position information.

3. The method according to claim 2, wherein the target image comprises a pre-captured image and the graphic code recognition operation comprises a trigger operation on the target image, and wherein:
    determining the target recognition position indicated by the graphic code recognition operation comprises determining a trigger position corresponding to the graphic code recognition operation as the target recognition position; and
    determining the target graphic code according to the target recognition position and the graphic code position information comprises:
        determining distances between the target recognition position and the at least two graphic codes according to position information of the trigger position and the graphic code position information of the at least two graphic codes; and
        determining a graphic code corresponding to the shortest distance as the target graphic code.

4. The method according to claim 2, wherein the target image comprises an image displayed in a viewfinder of the terminal, and the graphic code recognition operation comprises a photo-shooting operation on the target image, and wherein:
    determining the target recognition position indicated by the graphic code recognition operation comprises determining a position corresponding to a center of the viewfinder as the target recognition position; and
    determining the target graphic code according to the target recognition position and the graphic code position information comprises:
        determining distances between the target recognition position and the at least two graphic codes according to position information of the center of the viewfinder and the graphic code position information of the at least two graphic codes; and
        determining a graphic code corresponding to the shortest distance as the target graphic code.

5. The method according to claim 1, wherein the target detection model comprises i residual networks that are connected in series and a dilated convolutional neural network, each of the residual networks comprising a downsampling block and j first residual blocks, each of the first residual blocks comprising a depthwise convolutional layer; and the dilated convolutional neural network comprising k second residual blocks, each of the second residual blocks comprising a dilated convolutional layer, and i, j, and k being integers greater than or equal to 2.

6. The method according to claim 1, further comprising:
    obtaining predicted graphic code types and type confidences of the at least two graphic codes outputted by the target detection model; and determining graphic code types of the at least two graphic codes according to the predicted graphic code types and the type confidences, wherein before displaying the target graphic code recognition result corresponding to the target graphic code, the method further comprises performing graphic code recognition on the target graphic code through a target decoder corresponding to a target graphic code type to obtain the target graphic code recognition result, the target graphic code type being a graphic code type corresponding to the target graphic code.

7. The method according to claim 1, further comprising:
obtaining predicted graphic code types and type confidences of the at least two graphic codes outputted by the target detection model; and
determining graphic code types of the at least two graphic codes according to the predicted graphic code types and the type confidences,
wherein before displaying the target graphic code recognition result corresponding to the target graphic code, the method further comprises performing graphic code recognition on the at least two graphic codes through decoders corresponding to the graphic code types of the at least two graphic codes to obtain graphic code recognition results corresponding to the at least two graphic codes; and determining a graphic code recognition result corresponding to the target graphic code as the target graphic code recognition result.

8. The method according to claim 1, wherein determining a target graphic code indicated by the graphic code recognition operation according to the graphic code position information comprises:
performing graphic code recognition on the at least two graphic codes according to the graphic code position information to obtain at least two graphic code recognition results;
determining a target application program according to the graphic code recognition operation; and
determining a graphic code corresponding to a graphic code recognition result as the target graphic code in response to the graphic code recognition result being supported by the target application program.

9. A apparatus for graphic code recognition, comprising a memory for storing computer readable instructions and a processor in communication with the memory, wherein the processor is configured to execute the computer readable instructions to cause the apparatus to:
display a target image, the target image comprising at least two graphic codes;
in response to receiving a graphic code recognition operation on the target image for selecting one of the at least two graphic codes to recognize:
input the target image into a target detection model to obtain predicted graphic code position information and position confidences of the at least two graphic codes; and
determine the graphic code position information of the at least two graphic codes according to the predicted graphic code position information and the position confidences;
determine a target graphic code indicated by the graphic code recognition operation according to the graphic code position information, the target graphic code belonging to the at least two graphic codes; and
display a target graphic code recognition result corresponding to the target graphic code.

10. The apparatus according to claim 9, wherein, when the processor is configured to cause the apparatus to determine the target graphic code indicated by the graphic code recognition operation according to the graphic code position information, the processor is configured to cause the apparatus to:
determine a target recognition position indicated by the graphic code recognition operation; and
determine the target graphic code according to the target recognition position and the graphic code position information.

11. The apparatus according to claim 10, wherein the target image comprises a pre-captured image and the graphic code recognition operation comprises a trigger operation on the target image, and wherein:
when the processor is configured to cause the apparatus to determine the target recognition position indicated by the graphic code recognition operation, the processor is configured to cause the apparatus to determine a trigger position corresponding to the graphic code recognition operation as the target recognition position; and
when the processor is configured to cause the apparatus to determine the target graphic code according to the target recognition position and the graphic code position information, the processor is configured to cause the apparatus to:
determine distances between the target recognition position and the at least two graphic codes according to position information of the trigger position and the graphic code position information of the at least two graphic codes; and
determine a graphic code corresponding to the shortest distance as the target graphic code.

12. The apparatus according to claim 10, wherein the target image comprises an image displayed in a viewfinder of the apparatus, and the graphic code recognition operation comprises a photo-shooting operation on the target image, and wherein:
when the processor is configured to cause the apparatus to determine the target recognition position indicated by the graphic code recognition operation, the processor is configured to cause the apparatus to determine a position corresponding to a center of the viewfinder as the target recognition position; and
when the processor is configured to cause the apparatus to determine the target graphic code according to the target recognition position and the graphic code position information, the processor is configured to cause the apparatus to:
determine distances between the target recognition position and the at least two graphic codes according to position information of the center of the viewfinder and the graphic code position information of the at least two graphic codes; and
determine a graphic code corresponding to the shortest distance as the target graphic code.

13. The apparatus according to claim 9, wherein the target detection model comprises i residual networks that are connected in series and a dilated convolutional neural network, each of the residual networks comprising a downsampling block and j first residual blocks, each of the first residual blocks comprising a depthwise convolutional layer; and the dilated convolutional neural network comprising k second residual blocks, each of the second residual blocks comprising a dilated convolutional layer, and i, j, and k being integers greater than or equal to 2.

14. The apparatus according to claim 9, wherein, when the processor executes the computer readable instructions, the processor is configured to further cause the apparatus to:
obtain predicted graphic code types and type confidences of the at least two graphic codes outputted by the target detection model; and
determine graphic code types of the at least two graphic codes according to the predicted graphic code types and the type confidences; and
wherein, before the processor is configured to cause the apparatus to display the target graphic code recognition result corresponding to the target graphic code, the processor is configured to further cause the apparatus to perform graphic code recognition on the target graphic code through a target decoder corresponding to a target graphic code type to obtain the target graphic code recognition result, the target graphic code type being a graphic code type corresponding to the target graphic code.

15. The apparatus according to claim 9, wherein, when the processor executes the computer readable instructions, the processor is configured to further cause the apparatus to:
obtain predicted graphic code types and type confidences of the at least two graphic codes outputted by the target detection model; and
determine graphic code types of the at least two graphic codes according to the predicted graphic code types and the type confidences; and
wherein, before the processor is configured to cause the apparatus to display the target graphic code recognition result corresponding to the target graphic code, the processor is configured to further cause the apparatus to perform graphic code recognition on the at least two graphic codes through decoders corresponding to the graphic code types of the at least two graphic codes to obtain graphic code recognition results corresponding to the at least two graphic codes; and determine a graphic code recognition result corresponding to the target graphic code as the target graphic code recognition result.

16. The apparatus according to claim 9, wherein, when the processor is configured to cause the apparatus to determine a target graphic code indicated by the graphic code recognition operation according to the graphic code position information, the processor is configured to cause the apparatus to:
perform graphic code recognition on the at least two graphic codes according to the graphic code position information to obtain at least two graphic code recognition results;
determine a target application program according to the graphic code recognition operation; and
determine a graphic code corresponding to a graphic code recognition result as the target graphic code in response to the graphic code recognition result being supported by the target application program.

17. A non-transitory storage medium for storing computer readable instructions, the computer readable instructions, when executed a processor, causing the processor to:
display a target image, the target image comprising at least two graphic codes;
in response to receiving a graphic code recognition operation on the target image for selecting one of the at least two graphic codes to recognize:
input the target image into a target detection model to obtain predicted graphic code position information and position confidences of the at least two graphic codes; and
determine the graphic code position information of the at least two graphic codes according to the predicted graphic code position information and the position confidences;
determine a target graphic code indicated by the graphic code recognition operation according to the graphic code position information, the target graphic code belonging to the at least two graphic codes; and
display a target graphic code recognition result corresponding to the target graphic code.

18. The non-transitory storage medium according to claim 17, wherein, when the computer readable instructions cause the processor to determine the target graphic code indicated by the graphic code recognition operation according to the graphic code position information, the computer readable instructions cause the processor to:
determine a target recognition position indicated by the graphic code recognition operation; and
determine the target graphic code according to the target recognition position and the graphic code position information.

* * * * *